United States Patent
Kirner et al.

(10) Patent No.: US 10,897,403 B2
(45) Date of Patent: *Jan. 19, 2021

(54) DISTRIBUTED NETWORK MANAGEMENT USING A LOGICAL MULTI-DIMENSIONAL LABEL-BASED POLICY MODEL

(71) Applicant: Illumio, Inc., Sunnyvale, CA (US)

(72) Inventors: Paul J. Kirner, Palo Alto, CA (US);
Daniel R. Cook, San Jose, CA (US);
Juraj G. Fandli, Campbell, CA (US);
Matthew K. Glenn, Mountain View, CA (US); Mukesh Gupta, Milpitas, CA (US); Andrew S. Rubin, Palo Alto, CA (US); Jerry B. Scott, Los Altos, CA (US); Sehyo Chang, Sunnyvale, CA (US); Alan B. Stokol, Walnut Creek, CA (US)

(73) Assignee: Illumio, Inc., Sunnyvale, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 15/861,665

(22) Filed: Jan. 3, 2018

(65) Prior Publication Data
US 2018/0131577 A1    May 10, 2018

Related U.S. Application Data

(63) Continuation of application No. 14/249,128, filed on Apr. 9, 2014, now Pat. No. 9,882,783.
(Continued)

(51) Int. Cl.
*H04L 12/24* (2006.01)
*H04L 29/06* (2006.01)
(Continued)

(52) U.S. Cl.
CPC .......... *H04L 41/145* (2013.01); *H04L 41/082* (2013.01); *H04L 41/0869* (2013.01);
(Continued)

(58) Field of Classification Search
CPC . G06F 3/0484; H04L 63/0876; H04L 63/101; H04L 63/102; H04L 63/108;
(Continued)

(56) References Cited

U.S. PATENT DOCUMENTS 7,418,490 B1   8/2008 Zhang et al.
7,747,736 B2   6/2010 Childress et al.
(Continued)

FOREIGN PATENT DOCUMENTS

CN         1483270      3/2004
CN       101411156      4/2009
(Continued)

OTHER PUBLICATIONS

Akai, K et al., "Proposal for Cooperation Resource Information Manager and Access Control List Manager of IEEE1888," Feb. 7, 2013, IE/CE Technical Report, vol. 112, No. 430, 1 page (English abstract only).
(Continued)

*Primary Examiner* — Barbara B Anyan
(74) *Attorney, Agent, or Firm* — Fenwick & West LLP

(57) ABSTRACT

Management instructions for a particular managed server within an administrative domain are generated according to an administrative domain-wide management policy that comprises a set of one or more rules. The administrative domain includes a plurality of managed servers. A determination is made regarding which rules within the set of rules are relevant to the particular managed server. Function-level instructions are generated based on the rules that were determined to be relevant. A determination is made regard-
(Continued)

ing which managed servers within the plurality of managed servers are relevant to the particular managed server. The function-level instructions and information regarding the managed servers that were determined to be relevant are sent to the particular managed server. The particular managed server uses the function-level instructions and information regarding the managed servers to configure a management module so that the configured management module implements the administrative domain-wide management policy.

20 Claims, 8 Drawing Sheets

Related U.S. Application Data

(60) Provisional application No. 61/899,468, filed on Nov. 4, 2013, provisional application No. 61/810,480, filed on Apr. 10, 2013.

(51) Int. Cl.
| | |
|---|---|
| H04L 12/715 | (2013.01) |
| G06F 9/50 | (2006.01) |
| G06Q 10/06 | (2012.01) |
| H04L 29/08 | (2006.01) |
| G06F 11/36 | (2006.01) |
| G06Q 30/02 | (2012.01) |

(52) U.S. Cl.
CPC ......... H04L 41/0893 (2013.01); H04L 63/10 (2013.01); H04L 63/20 (2013.01); G06F 9/50 (2013.01); G06F 11/3624 (2013.01); G06Q 10/06 (2013.01); G06Q 30/02 (2013.01); H04L 29/06 (2013.01); H04L 45/04 (2013.01); H04L 67/125 (2013.01)

(58) Field of Classification Search
CPC ......... H04L 67/10; H04L 67/20; H04L 67/24; H04W 12/08; H04W 48/02; H04W 48/16; H04W 88/02; H04W 8/20
See application file for complete search history.

(56) References Cited

U.S. PATENT DOCUMENTS

| | | | |
|---|---|---|---|
| 7,813,484 | B2 | 10/2010 | Jackson et al. |
| 7,925,666 | B1 | 4/2011 | Johnson et al. |
| 8,539,545 | B2 | 9/2013 | Kartha et al. |
| 8,677,499 | B2 | 3/2014 | Lim |
| 8,839,232 | B2* | 9/2014 | Taylor ............. G06Q 30/02 717/176 |
| 8,843,561 | B2 | 9/2014 | Chen et al. |
| 9,124,636 | B1 | 9/2015 | Rathor |
| 9,882,783 | B2 | 1/2018 | Kirner et al. |
| 10,104,185 | B1 | 10/2018 | Sharifi Mehr et al. |
| 2002/0065878 | A1 | 5/2002 | Paxhia et al. |
| 2002/0176377 | A1 | 11/2002 | Hamilton |
| 2003/0018792 | A1 | 1/2003 | Shiouchi et al. |
| 2003/0028621 | A1* | 2/2003 | Furlong ............. H04L 29/06 709/219 |
| 2003/0115484 | A1 | 6/2003 | Moriconi et al. |
| 2003/0231212 | A1 | 12/2003 | Slemmer et al. |
| 2004/0039789 | A1 | 2/2004 | Jackson et al. |
| 2004/0039798 | A1 | 2/2004 | Hotz et al. |
| 2004/0039803 | A1 | 2/2004 | Law |
| 2004/0064575 | A1 | 4/2004 | Rasheed et al. |
| 2004/0162901 | A1 | 8/2004 | Mangipudi et al. |
| 2005/0147035 | A1 | 7/2005 | Sylvain et al. |
| 2006/0262786 | A1 | 11/2006 | Shimizu et al. |
| 2007/0002834 | A1 | 1/2007 | Taylor |
| 2007/0156670 | A1 | 7/2007 | Lim |
| 2007/0204030 | A1 | 8/2007 | Toshihiro |
| 2007/0282986 | A1 | 12/2007 | Childress et al. |
| 2008/0060080 | A1 | 3/2008 | Lim |
| 2008/0109396 | A1 | 5/2008 | Kacin |
| 2008/0184277 | A1 | 7/2008 | Burns et al. |
| 2008/0195755 | A1 | 8/2008 | Lu et al. |
| 2008/0282336 | A1 | 11/2008 | Diaz Cuellar et al. |
| 2008/0294920 | A1 | 11/2008 | Hatasaki et al. |
| 2008/0306883 | A1* | 12/2008 | Baffier ............. G06F 8/61 705/400 |
| 2009/0198804 | A1 | 8/2009 | Danforth |
| 2009/0210520 | A1 | 8/2009 | Maeno |
| 2009/0217346 | A1 | 8/2009 | Manring |
| 2009/0222795 | A1 | 9/2009 | Frank et al. |
| 2009/0286509 | A1* | 11/2009 | Huber ............. G06Q 20/1235 455/410 |
| 2010/0064009 | A1 | 3/2010 | Chen et al. |
| 2010/0168876 | A1 | 7/2010 | Nakano et al. |
| 2010/0188975 | A1 | 7/2010 | Raleigh |
| 2010/0333165 | A1 | 12/2010 | Basak et al. |
| 2011/0060823 | A1 | 3/2011 | Phillippe et al. |
| 2011/0078309 | A1 | 3/2011 | Bloch et al. |
| 2011/0296005 | A1 | 12/2011 | Labovitz et al. |
| 2012/0023546 | A1 | 1/2012 | Kartha et al. |
| 2012/0030731 | A1 | 2/2012 | Bhargava et al. |
| 2012/0087262 | A1 | 4/2012 | Rasanen et al. |
| 2012/0131164 | A1 | 5/2012 | Bryan et al. |
| 2012/0210425 | A1 | 8/2012 | Porras et al. |
| 2012/0255012 | A1 | 10/2012 | Sallam |
| 2013/0081102 | A1 | 3/2013 | Beauvais et al. |
| 2013/0159039 | A1 | 6/2013 | Brech et al. |
| 2014/0049394 | A1 | 2/2014 | Snyder et al. |
| 2014/0053226 | A1 | 2/2014 | Fadida |
| 2014/0280305 | A1 | 9/2014 | James et al. |
| 2014/0282519 | A1 | 9/2014 | Apte et al. |
| 2014/0310408 | A1 | 10/2014 | Kirner et al. |
| 2014/0310415 | A1 | 10/2014 | Kirner et al. |
| 2014/0355542 | A1 | 12/2014 | Zhang |
| 2015/0012332 | A1 | 1/2015 | Papachristos |
| 2015/0127832 | A1 | 5/2015 | Kirner et al. |
| 2015/0128211 | A1 | 5/2015 | Kirner et al. |
| 2015/0128212 | A1 | 5/2015 | Scott et al. |
| 2015/0181607 | A1 | 6/2015 | Csaszar et al. |
| 2015/0188789 | A1 | 7/2015 | Jayaprakash |
| 2017/0177413 | A1 | 6/2017 | Wisniewski et al. |
| 2017/0353496 | A1 | 12/2017 | Pai et al. |
| 2018/0026911 | A1 | 1/2018 | Anholt et al. |
| 2018/0167487 | A1 | 6/2018 | Vyas et al. |
| 2018/0309637 | A1 | 10/2018 | Gill et al. |
| 2018/0357068 | A1 | 12/2018 | Ambichl et al. |
| 2019/0075130 | A1 | 3/2019 | Petry et al. |
| 2019/0089651 | A1 | 3/2019 | Pignataro et al. |

FOREIGN PATENT DOCUMENTS

| | | |
|---|---|---|
| CN | 101595465 | 12/2009 |
| CN | 102204267 | 9/2011 |
| CN | 102379139 | 3/2012 |
| JP | 2002507295 | 3/2002 |
| JP | 2005-174201 | 6/2005 |
| JP | 2011243112 | 12/2011 |
| JP | 201243445 | 3/2012 |
| KR | 10-20140099325 | 8/2014 |
| TW | 200839632 | 10/2008 |
| TW | 201310944 | 3/2013 |
| WO | WO 98/54644 | 12/1998 |
| WO | WO 2005/112390 | 11/2005 |
| WO | WO 2006/043322 | 5/2008 |
| WO | WO2009/008482 A1 | 1/2009 |
| WO | WO2012/160809 A1 | 11/2012 |

OTHER PUBLICATIONS

Japan Patent Office, Office Action, Japanese Application No. 2016-552416, dated Oct. 2, 2018, 6 pages.
Kakuta, T. et al., "A detection method of malware infections based on 'graylists,'" IE/CE Technical Report, Jun. 26 2014, vol. 114, No. 118, 7 pages (with English abstract).

(56) References Cited

OTHER PUBLICATIONS

Dell Kace, "Dell Kace K1000 Series Management Appliance Architecture," 2010, 15 Pages, can be retrieved at <URL:http://partnerdirect.dell.com/sites/channel/Documents/Emerging.su-b.--Documents/WP.sub.--Dell.sub.--KACE.sub.--K1000 Series.sub.--Architecture.pdf>.
PCT International Search Report and Written Opinion for PCT/US2014/33524, dated Sep. 11, 2014, 18 Pages.
PCT International Search Report and Written Opinion for PCT/US2014/33540, dated Sep. 11, 2014, 12 Pages.
Invitation to Pay Additional Fees and, Where Applicable, Protest Fee, PCT/US2014/054505, dated Apr. 23, 2015, 2 Pages.
PCT International Search Report and Written Opinion for PCT/US14/54505, dated Jun. 26, 2015, 15 Pages.
Search Report for ROC (Taiwan) Patent Application. No. 103132517, dated Sep. 4, 2015, 7 pages (With Concise Explanation of Relevance).
Office Action for Taiwanese Patent Application No. TW 103113296, dated Sep. 23, 2015, 28 Pages.
Patent Examination Report No. 1 for Australian Patent Application No. AU 2014251011, dated Nov. 26, 2015, 2 Pages.
Office Action for Canadian Patent Application No. CA 2,908,871, dated Dec. 11, 2015, 4 Pages.
Search Report for ROC (Taiwan) Patent Application. No. 103132517, dated Sep. 4, 2015, 11 pages.
Office Action for U.S. Appl. No. 14/474,916, dated May 19, 2017, 15 Pages.
Extended European Search Report for European Patent Application No. EP 14782899.0, dated Apr. 11, 2016, 11 Pages.
Office Action for Canadian Patent Application No. CA 2,903,411, dated May 26, 2016, 3 Pages.
Office Action for Canadian Patent Application No. CA 2,908,871, dated Jun. 13, 2016, 4 Pages.
Office Action for Japanese Patent Application No. JP 2016-507639, dated Jun. 14, 2016, 4 Pages.
Office Action for U.S. Appl. No. 14/249,145, dated Jun. 3, 2016, 10 Pages.
Office Action for U.S. Appl. No. 14/474,916, dated Jun. 16, 2016, 14 Pages.
Office Action for Canadian Patent Application No. CA 2,908,871, dated Dec. 22, 2016, 4 Pages.
European Search Report for European Patent Application No. EP 14782219, dated Nov. 25, 2016, 14 Pages.
Communication Pursuant to Article 94(3) EPC for European Patent Application No. EP 14782899.0, dated Feb. 10, 2017, 7 Pages.
First Office Action for Chinese Patent Application No. CN 2014800300432, dated Apr. 21, 2017, 24 Pages.
First Office Action for Chinese Patent Application No. CN 2014800179325, dated Apr. 7, 2017, 11 Pages.
Office Action for Canadian Patent Application No. CA 2,903,411, dated May 1, 2017, 5 Pages.
Partial Supplementary European Search Report for European Patent Application No. EP 14863433.0, dated Apr. 12, 2017, 8 Pages.
Extended European Search Report for European Patent Application No. EP 14863433.0, dated Jul. 7, 2017, 15 Pages.
Invitation pursuant to Article 94(3) and Rule 71(1) EPC for European Patent Application No. EP 14782899.0, dated Aug. 23, 2017, 10 Pages.
First Office Action for Chinese Patent Application No. CN 201480060318.7, dated Nov. 13, 2017, 26 Pages (With English Translation).
Communication pursuant to Article 94(3) EPC for European Patent Application No. EP 14782219.1, dated Dec. 5, 2017, 5 Pages.
Oka, E., et al., "A study on distributed processing systems focusing on management and control of system status," Nov. 24, 1994, 8 Pages (With English Abstract).
Communication pursuant to Article 94(3) EPC for European Patent Application No. EP 14782219.1, Apr. 20, 2018, 6 Pages.
Examination Report No. 1 for Australian Patent Application No. AU 2014251019, dated Apr. 23, 2018, 2 Pages.
Office Action for U.S. Appl. No. 14/249,128, dated Feb. 2, 2016, 8 Pages.
Office Action for U.S. Appl. No. 14/249,128, dated Aug. 25, 2016, 9 Pages.
Office Action for U.S. Appl. No. 14/249,128, dated Apr. 6, 2017, 11 Pages.
Examination Report, European Patent Office, European Application No. 14856997.3, dated Jan. 3, 2019, 7 pages.
Netcitadel et al., "Firewall Builder 5 User's Guide," May 21, 2013, Retrieved from the internet: URL: http://fwbuilder.sourceforge.net/4.0/docs/users_guide5/UsersGuide5.pdf [Accessed Jan. 17, 2019], 487 pages.
United States Office Action, U.S. Appl. No. 15/597,127, dated Feb. 21, 2020, nine pages.
United States Office Action, U.S. Appl. No. 16/000,847, dated Feb. 4, 2020, 26 pages.
United States Office Action, U.S. Appl. No. 15/915,043, dated Jan. 24, 2020, nine pages.

* cited by examiner

DISTRIBUTED NETWORK MANAGEMENT USING A LOGICAL MULTI-DIMENSIONAL LABEL-BASED POLICY MODEL

RELATED APPLICATIONS

This application is a continuation of U.S. patent application Ser. No. 14/249,128 filed on Apr. 9, 2014, now U.S. Pat. No. 9,882,783, which claims the benefit of U.S. Provisional Application No. 61/810,480, filed Apr. 10, 2013, and U.S. Provisional Application No. 61/899,468, filed Nov. 4, 2013, which are each incorporated by reference herein. This application is related to U.S. application Ser. No. 14/249,145, filed on Apr. 9, 2014, which is incorporated by reference herein.

BACKGROUND

1. Technical Field

The subject matter described herein generally relates to the field of managing servers (physical or virtual) of an administrative domain and, in particular, to managing servers according to an administrative domain-wide policy that adheres to a logical multi-dimensional label-based policy model.

2. Background Information

Servers (physical or virtual) of an administrative domain are managed according to a policy. For example, a security policy might specify access control and/or secure connectivity, while a resource-usage policy might specify usage of the administrative domain's computing resources (e.g., disks and/or peripherals). Conventional policies reference physical devices and are expressed in terms of low-level constructs such as Internet Protocol (IP) addresses, IP address ranges, subnetworks, and network interfaces. These low-level constructs make it difficult to write a fine-grained policy in an abstract and natural way.

SUMMARY

The above and other issues are addressed by a method, non-transitory computer-readable storage medium, and system for generating management instructions for a particular managed server within an administrative domain according to an administrative domain-wide management policy that comprises a set of one or more rules. The administrative domain includes a plurality of managed servers. An embodiment of the method comprises determining which rules within the set of rules are relevant to the particular managed server. The method further comprises generating function-level instructions based on the rules that were determined to be relevant. The method further comprises determining which managed servers within the plurality of managed servers are relevant to the particular managed server. The method further comprises sending, to the particular managed server, the function-level instructions and information regarding the managed servers that were determined to be relevant. The particular managed server uses the function-level instructions and information regarding the managed servers to configure a management module so that the configured management module implements the administrative domain-wide management policy.

An embodiment of the medium stores computer program modules executable to perform steps. The steps comprise determining which rules within the set of rules are relevant to the particular managed server. The steps further comprise generating function-level instructions based on the rules that were determined to be relevant. The steps further comprise determining which managed servers within the plurality of managed servers are relevant to the particular managed server. The steps further comprise sending, to the particular managed server, the function-level instructions and information regarding the managed servers that were determined to be relevant. The particular managed server uses the function-level instructions and information regarding the managed servers to configure a management module so that the configured management module implements the administrative domain-wide management policy.

An embodiment of the system comprises a non-transitory computer-readable storage medium storing computer program modules executable to perform steps. The steps comprise determining which rules within the set of rules are relevant to the particular managed server. The steps further comprise generating function-level instructions based on the rules that were determined to be relevant. The steps further comprise determining which managed servers within the plurality of managed servers are relevant to the particular managed server. The steps further comprise sending, to the particular managed server, the function-level instructions and information regarding the managed servers that were determined to be relevant. The particular managed server uses the function-level instructions and information regarding the managed servers to configure a management module so that the configured management module implements the administrative domain-wide management policy.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein.

Reference will now be made to several embodiments, examples of which are illustrated in the accompanying figures. It is noted that wherever practicable similar or like reference numbers may be used in the figures and may indicate similar or like functionality.

Figure 1:
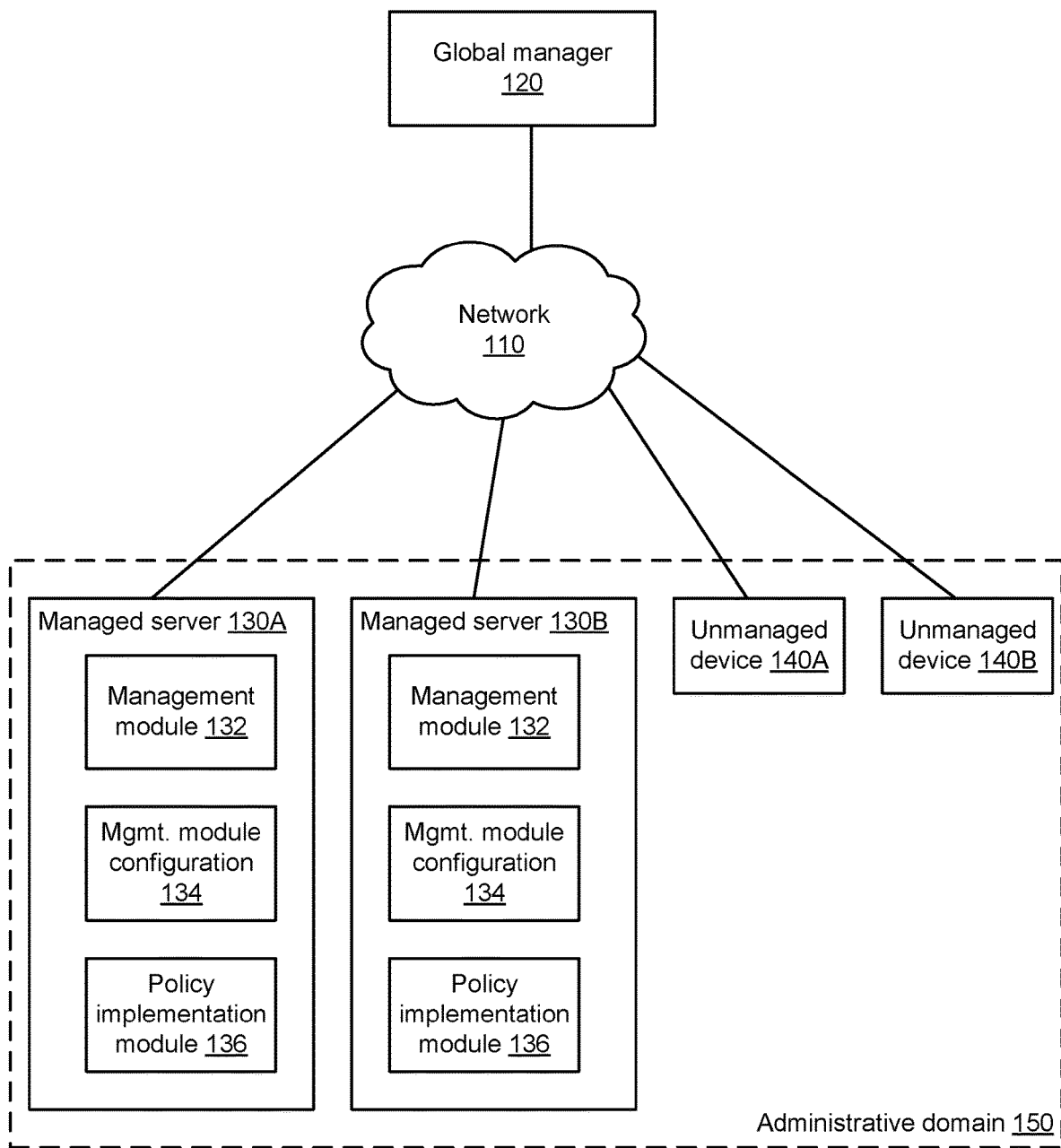
FIG. 1 is a high-level block diagram illustrating an environment for managing servers (physical or virtual) of an administrative domain, according to one embodiment.

FIG. 1 is a high-level block diagram illustrating an environment 100 for managing servers (physical or virtual) 130 of an administrative domain 150, according to one embodiment. The administrative domain 150 can correspond to an enterprise such as, for example, a service provider, a corporation, a university, or a government agency. The environment 100 may be maintained by the enterprise itself or by a third party (e.g., a second enterprise) that helps the enterprise manage its servers 130. As shown, the environment 100 includes a network 110, a global manager 120, multiple managed servers 130, and multiple unmanaged devices 140. The multiple managed servers 130 and the multiple unmanaged devices 140 are associated with the administrative domain 150. For example, they are operated by the enterprise or by a third party (e.g., a public cloud service provider) on behalf of the enterprise. While one global manager 120, two managed servers 130, and two unmanaged devices 140 are shown in the embodiment depicted in FIG. 1 for clarity, other embodiments can have different numbers of global managers 120, managed servers 130, and/or unmanaged devices 140.

The network 110 represents the communication pathway between the global manager 120, the managed servers 130, and the unmanaged devices 140. In one embodiment, the network 110 uses standard communications technologies and/or protocols and can include the Internet. In another embodiment, the entities on the network 110 can use custom and/or dedicated data communications technologies.

Figure 3:
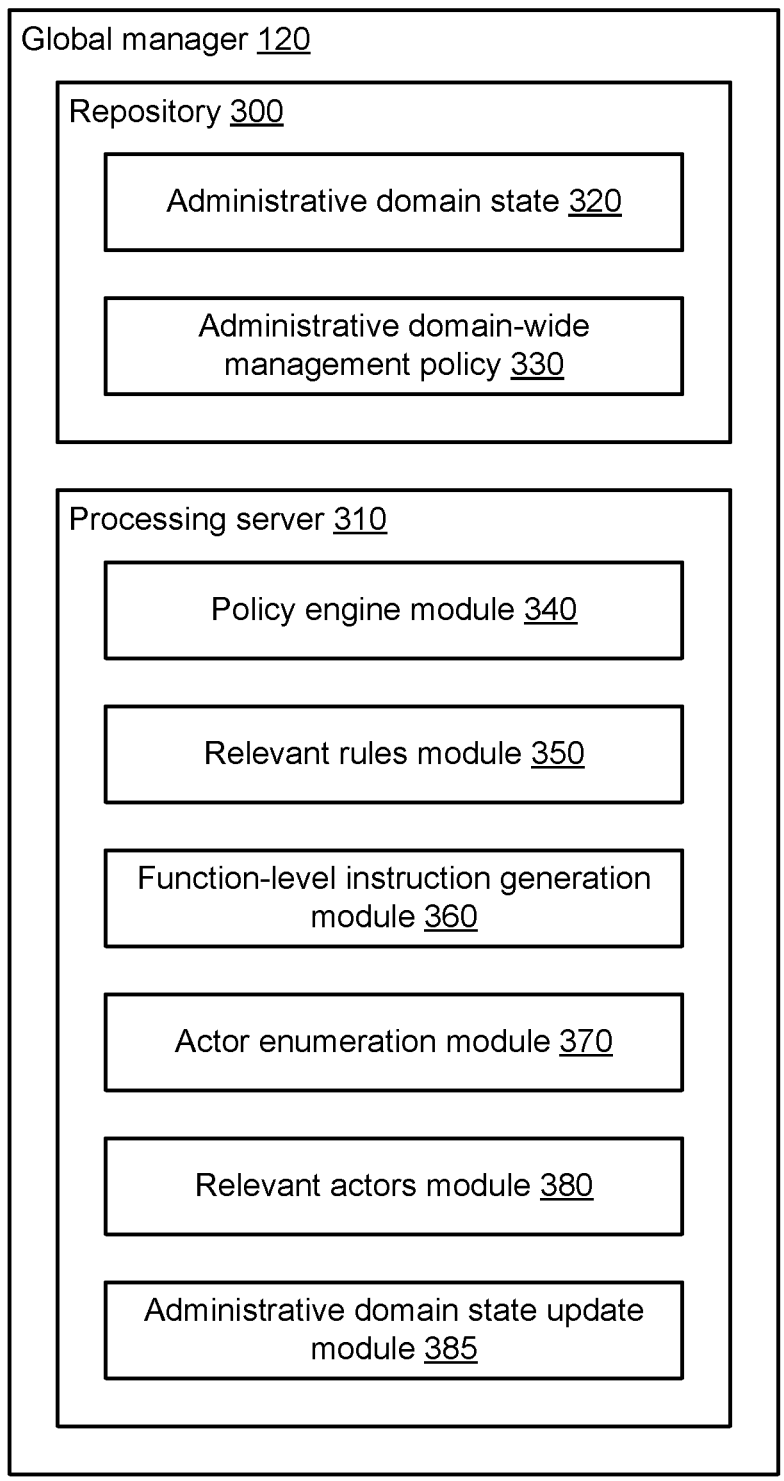
FIG. 3 is a high-level block diagram illustrating a detailed view of a global manager, according to one embodiment.

A managed server 130 is a machine (physical or virtual) that implements an administrative domain-wide management policy 330 (shown in FIG. 3). In one embodiment, a server is a user-space instance of a virtual server (sometimes referred to as a container, virtualization engine, virtual private server, or jail) according to operating system-level virtualization, which is a server virtualization method where the kernel of an operating system enables multiple isolated user-space instances, instead of only one instance. If a managed server 130 is a physical machine, then the managed server 130 is a computer or set of computers. If a managed server 130 is a virtual machine, then the managed server 130 executes on a computer or set of computers. The administrative domain-wide management policy 330 specifies whether and/or how entities associated with the administrative domain 150 are allowed to access (or be accessed by) other entities or otherwise consume (or provide) services. For example, the administrative domain-wide management policy 330 specifies security or resource usage. A security policy might specify access control, secure connectivity, disk encryption, and/or control of executable processes, while a resource-usage policy might specify usage of the administrative domain's computing resources (e.g., disks, peripherals, and/or bandwidth).

A managed server 130 includes a management module 132, a management module configuration 134, and a policy implementation module 136. The management module 132 implements the administrative domain-wide management policy 330. For example, in the case of security, the management module 132 can be a low-level network or security engine such as an operating system-level firewall, an Internet Protocol security (IPsec) engine, or a network traffic filtering engine (e.g., based on the Windows Filtering Platform (WFP) development platform). In the case of resource usage, the management module 132 can be a disk-usage engine or a peripheral-usage engine.

The management module configuration 134 affects the operation of the management module 132. For example, in the case of security, the management module configuration 134 can be access control rules applied by a firewall, secure connectivity policies applied by an IPsec engine (e.g., embodied as iptables entries and ipset entries in the Linux operating system), or filtering rules applied by a filtering engine. In the case of resource usage, the management module configuration 134 can be disk-usage policies applied by a disk-usage engine or peripheral-usage policies applied by a peripheral-usage engine.

The policy implementation module 136 generates the management module configuration 134 based on a) management instructions received from the global manager 120 and b) the state of the managed server 130. The management instructions are generated based, in part, on the administrative domain-wide management policy 330. The management module configuration 134 generated by the policy implementation module 136 implements that administrative domain-wide management policy 330 (to the extent that the policy concerns the managed server 130). This two-step process (generating management instructions and generating the management module configuration 134) is referred to as "instantiating" a management policy. The policy implementation module 136 also monitors the local state of the managed server 130 and sends local state information to the global manager 120.

In one embodiment, the policy implementation module 136 is part of a larger proprietary module (not shown). The proprietary module is loaded onto a device that already has a management module 132 and a management module configuration 134, thereby transforming the device from an unmanaged device 140 to a managed server 130. The policy implementation module 136 is further described below with reference to FIGS. 4, 6, and 7.

An unmanaged device 140 is a computer (or set of computers) that does not include a policy implementation module 136. An unmanaged device 140 does not implement the administrative domain-wide management policy 330. However, interaction between a managed server 130 and an unmanaged device 140 can be subject to the administrative domain-wide management policy 330 (as implemented by the managed server 130). One example of an unmanaged device 140 is a network circuit that is used by an administrative domain 150. Another example of an unmanaged device 140 is a device used by a person to authenticate himself to the administrative domain 150 (e.g., a notebook or desktop computer, a tablet computer, or a mobile phone).

The global manager 120 is a computer (or set of computers) that generates management instructions for managed servers 130 and sends the generated management instructions to the servers. The management instructions are generated based on a) the state of the administrative domain's computer network infrastructure 320 and b) an administrative domain-wide management policy 330. The state of the administrative domain's computer network infrastructure 320 includes descriptions of managed servers 130 and (optionally) descriptions of unmanaged devices 140. The global manager 120 also processes local state information received from managed servers 130.

The administrative domain-wide management policy 330 is based on a logical management model that does not reference managed servers 130 using low-level constructs such as IP addresses, IP address ranges, subnetworks, and network interfaces. Instead, the logical management model references managed servers 130 based on their high-level characteristics, referred to herein as "labels." A label is a pair that includes a "dimension" (a high-level characteristic) and a "value" (the value of that high-level characteristic). A management policy constructed in this multi-dimensional space is more expressive than a management policy constructed according to a single-characteristic network/IP address-based policy model. In particular, expressing management policy using the higher-level abstractions of "labels" enables people to better understand, visualize, and modify management policy.

The logical management model (e.g., the number and types of dimensions available and those dimensions' possible values) is configurable. In one embodiment, the logical management model includes the following dimensions and values, as shown in Table 1:

TABLE 1

Example of logical management model

| Dimension | Meaning (M), Values (V) |
| --- | --- |
| Role | M: The role of the managed server within the administrative domain. <br> V: web, API, database |
| Environment | M: The lifecycle stage of the managed server. <br> V: production, staging, development |
| Application | M: The logical application (higher-level grouping of managed servers) to which the managed server belongs. <br> V: trading, human resources |
| Line of Business | M: The business unit to which the managed server belongs. <br> V: marketing, engineering |
| Location | M: The location of the managed server. Can be physical (e.g., country or geographical region) or logical (e.g., network). Physical is particularly useful for expressing geographic compliance requirements. <br> V: US or EU (physical), us-west-1 or us-east-2 (logical) |

The logical management model enables multiple managed servers 130 to be grouped together by specifying one or more labels (referred to herein as a "label set") that describe all of the managed servers 130 in the group. A label set includes either zero values or one value for a dimension in the logical management model. A label set need not include labels for all dimensions in the logical management model. In this way, the logical management model enables the segmentation and separation of an administrative domain's managed servers 130 and the creation of arbitrary groupings of managed servers 130. The logical management model also allows for a single managed server 130 to exist in multiple overlapping sets (i.e., multiple overlapping groups of managed servers). The logical management model does not limit the single managed server 130 to existing in a hierarchy of nested sets.

For example, in the case of security, segmentation can be used with access control policies to define groups of managed servers 130 that are subject to particular policies. Similarly, segmentation can be used with secure connectivity policies to define groups of managed servers 130 and the policies that apply to intra-group communications and inter-group communications. So, communications among a first group of managed servers 130 (specified by a first label set) can be restricted to a first secure connection setting (e.g., secure connection not required), and communications between the first group of managed servers and a second group of managed servers (specified by a second label set) can be restricted to a second secure connection setting (e.g., IPsec Encapsulating Security Payload (ESP)/Authentication Header (AH) Advanced Encryption Standard (AES)/Secure Hash Algorithm-2 (SHA-2)).

Each managed server 130 in the environment 100 implements the administrative domain-wide management policy 330 (to the extent that the policy concerns the managed server 130). As a result, the administrative domain-wide management policy 330 is applied in a distributed fashion throughout the administrative domain 150, and there are no choke points. Also, the administrative domain-wide management policy 330 is applied at the logical level independent of the administrative domain's physical network topology and network addressing schemes.

The global manager 120, the state of the administrative domain's computer network infrastructure 320, and the administrative domain-wide management policy 330 are further described below with reference to FIGS. 3, 5, and 8.

Figure 2:
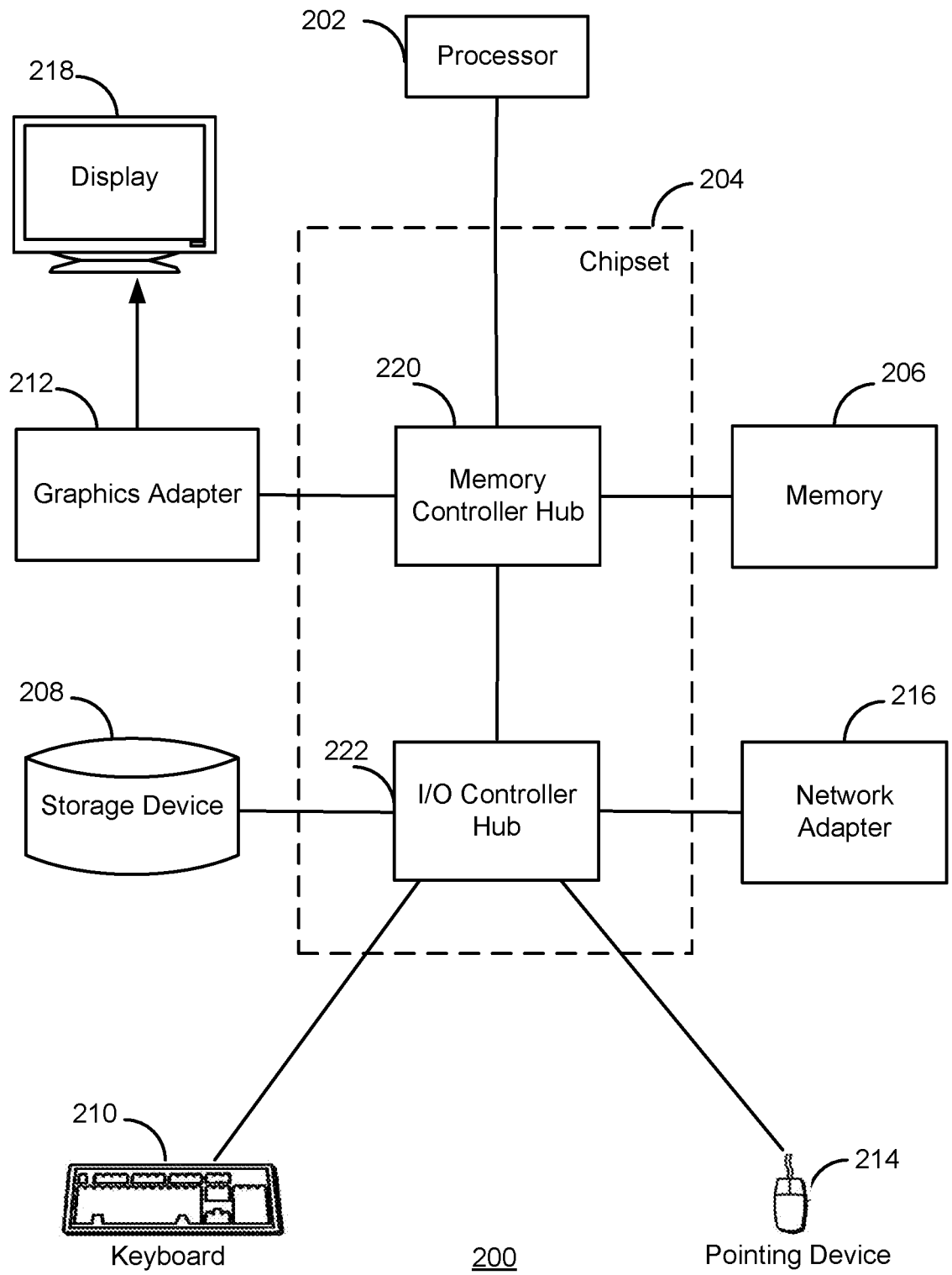
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the global manager 120 and/or the managed server 130 can be formed of multiple blade servers and lack a display device, keyboard, and other components, while the unmanaged device 140 can be a notebook or desktop computer, a tablet computer, or a mobile phone.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

FIG. 3 is a high-level block diagram illustrating a detailed view of a global manager 120, according to one embodiment. The global manager 120 includes a repository 300 and a processing server 310. The repository 300 is a computer (or set of computers) that stores the state of the administrative domain's computer network infrastructure 320 and the administrative domain-wide management policy 330. In one embodiment, the repository 300 includes a server that provides the processing server 310 access to the administrative domain state 320 and the management policy 330 in response to requests.

The state of the administrative domain's computer network infrastructure 320 includes descriptions of managed servers 130 and (optionally) descriptions of unmanaged devices 140. A description of a managed server 130 includes, for example, a unique identifier (UID), an online/offline indicator, one or more configured characteristics (optional), network exposure information, service information, and one or more labels that describe the managed server 130 (a label set).

The UID uniquely identifies the managed server 130. The online/offline indicator indicates whether the managed server 130 is online or offline. A "configured characteristic" stores a value associated with the managed server 130 and can be any type of information (e.g., an indication of which operating system is running on the managed server). A configured characteristic is used in conjunction with a rule's condition portion (described below).

The network exposure information concerns the managed server's network interfaces. In one embodiment, the network exposure information includes, for each of the managed server's network interfaces, an identifier of a "bidirectionally-reachable network" (BRN) to which the network interface is attached and zero or more IP addresses (and their subnets) that are used for operating within the BRN. In another embodiment, the network exposure information includes routing information and/or whether the managed server is behind a network address translator (NAT) (and, if it is behind a NAT, what type of NAT-1:1 or 1:N). A BRN is a set of subnets, within an organization or across organizations, where any node within the BRN can establish communication with any other node in the BRN. For example, all of the nodes in a BRN have unique IP addresses. In other words, a BRN does not contain any NATs. Network exposure information (e.g., a network interface's BRN identifier) can be used in conjunction with a rule's condition portion.

The service information includes, for example, process information and/or package information. Process information includes, for example, names of processes that the managed server 130 is running, which network ports and network interfaces those processes are listening on, which users initiated those processes, configurations of those processes, and command-line launch arguments of those processes. (Those processes correspond to the managed server 130 providing a service or using a service.) Package information includes, for example, which packages (executables, libraries, or other components) are installed on the managed server 130, the versions of those packages, the configurations of those packages, and the hash values of those packages.

A description of an unmanaged device 140 includes, for example, network exposure information (e.g., the IP address of the unmanaged device and an identifier of the BRN to which the unmanaged device is connected). An unmanaged device 140 is part of an "unmanaged device group" (UDG). An UDG includes one or more unmanaged devices 140. For example, the "Headquarters UDG" could include the primary circuit and the backup circuit that are used by an administrative domain's headquarters, where each circuit is associated with an IP address. An UDG is associated with a unique identifier (UID). Information stored in the administrative domain state 320 regarding an UDG includes the UID of the UDG and information regarding the unmanaged devices 140 in the UDG (e.g., their network exposure information).

Descriptions of managed servers 130 and unmanaged devices 140 can be loaded into the administrative domain state 320 in various ways, such as by interacting with the global manager 120 via a graphical user interface (GUI) or an application programming interface (API). Descriptions of managed servers 130 can also be loaded into the administrative domain state 320 based on local status information received from managed servers (described below).

Regarding managed servers' labels specifically (and configured characteristics, if any), the assignment (or reassignment) of a value for a dimension (or the setting of a configured characteristic's value) can be performed in even more ways. For example, the assignment/setting can be performed using a deployment and configuration tool as part of provisioning a managed server 130. Any such tool can be used, including off-the-shelf third-party tools (e.g., Puppet Labs' Puppet software, Opscode's Chef software, or CFEngine AS' CFEngine software) and custom tools that an administrative domain 150 might have.

As another example, the assignment/setting can be performed by a "label/configured characteristic engine" (not shown) that calculates labels and/or configured characteristic ("CC") values. In one embodiment, the label/CC engine calculates labels/CC values based on label/CC assignment rules. A label/CC assignment rule is a function that accesses data from the administrative domain state 320 and assigns (or suggests assignment of) a label or a CC value. A label/CC assignment rule can be preset or user-configurable. For example, the global manager 120 includes a set of pre-defined rules, but the end-user can modify and/or delete those rules and add new rules based on the user's own custom requirements. Label/CC assignment rules can be evaluated for a managed server 130 during the initialization process. Label/CC value suggestions can then be made for any dimension/CC, and the end-user can accept or reject those suggestions. For example, if a managed server 130 is executing the Postgres database or the MySQL database, then the suggested label could be <Role, Database>. If a managed server is executing the Linux operating system, then the suggested value for the operating system CC could be "Linux."

In another embodiment, the label/CC engine calculates labels/CC values based on cluster analysis. For example, the label/CC engine uses a combination of min-cut and K-means algorithms, with additional heuristics, of connected graphs to automatically identify a cluster of highly-connected managed servers 130. The cluster of managed servers 130 might correspond to an "application" (see Table 1) in the administrative domain 150. The end-user can choose to apply a value for the Application dimension (or any other dimension) to those managed servers 130 en masse.

The administrative domain-wide management policy 330 includes one or more rules. Broadly speaking, a "rule" specifies a relationship between one or more providers of a service and one or more consumers of that service.

Rule Function—The relationship is subjected to a "rule function", which is the practical effect of the rule. For example, in the case of security, the rule function could be access control, secure connectivity, disk encryption, or control of executable processes. A rule with an access control function specifies whether a consumer may use a provider's service. In one embodiment, the access control function uses a pure "whitelist" model, which means that only the allowable relationships are expressed, and all other relationships are blocked by default. A rule with a secure connectivity function specifies over what secure channels (e.g., encrypted network sessions using point-to-point data encryption) a consumer may use a provider's service. For example, a rule with a secure connectivity function could specify that usage of a provider's services must be encrypted when the provider is located in the US and the consumer is located in the EU. A rule with a disk encryption function specifies whether a provider must store its data on an encrypted file system. A rule with an executable process-control function specifies whether a provider must execute on an encrypted file system.

In the case of resource usage, the rule function could be disk-usage or peripheral-usage. A rule with a disk-usage function specifies an amount of data that a consumer can store on a provider. Note that a rule can specify other rule functions as well beyond just access control, secure connectivity, disk encryption, control of executable processes, disk usage, and peripheral usage. For example, a rule function could specify which Open Systems Interconnection (OSI) model Layer-7 services to apply to network traffic, the amount of metadata to collect for security analytics, or the triggers for capturing a complete network packet. The management policy model supports any number of rule functions that can be applied.

A rule function can be associated with one or more settings (referred to herein as a "function profile") that specify details regarding the practical effect of the rule. For example, settings associated with a secure connectivity rule function can be a list of cryptographic algorithms used to encrypt network traffic. In one embodiment, a rule function is associated with multiple function profiles, and a function profile includes a priority. This priority is used by the function-level instruction generation module 360, as described below.

Service—In general, a "service" is an arbitrary process executing on a specific network port using a specific network protocol. A service of a rule within the management policy 330 is specified by a port/protocol pair and (optionally) additional qualifications, such as process information and/or package information (described above with respect to a description of a managed server 130 within the administrative domain state 320). If a managed server 130 has multiple network interfaces, then a service can be exposed on all networks or on only a subset of those networks. The end-user specifies on which networks the service is exposed.

Providers/Consumers—The one or more providers of the service and the one or more consumers (i.e., users) of the service are managed servers 130 and/or unmanaged devices 140.

In one embodiment, a rule is represented within the administrative domain-wide management policy 330 using a set of information that includes a rule function portion, a service portion, a provided-by portion, a used-by portion, and an optional rule condition portion. The rule function portion describes the practical effect of the rule and can be associated with one or more settings (function profiles). The service portion describes the service to which the rule applies. If the service portion indicates "All", then the rule applies to all services.

The provided-by (PB) portion describes which managed servers 130 and/or unmanaged devices 140 can provide the service (i.e., who the "providers" are). If the PB portion indicates "Anybody", then anybody (e.g., any managed server 130 or unmanaged device 140) can provide the service. If the PB portion indicates "Any managed server", then any managed server 130 can provide the service. ("Any managed server" is equivalent to specifying a label set that contains a wildcard, thereby matching all managed servers 130.) The used-by (UB) portion describes which managed servers 130 and/or unmanaged devices 140 can use the service (i.e., who the "consumers" are). Similar to the PB portion, the UB portion can also indicate "Anybody" or "Any managed server."

Within the PB portion and the UB portion, a managed server 130 is specified by using a label set (i.e., one or more labels that describe the managed server) or a UID. The ability to specify managed servers 130 using label sets stems from the logical management model, which references managed servers based on their dimensions and values (labels). An unmanaged device 140 is specified by using a UID of an unmanaged device group (UDG). If a rule specifies an UDG, then the rule includes additional information regarding the unmanaged devices 140 in that group (e.g., the devices' network exposure information). The PB portion of a rule and/or the UB portion of a rule can include multiple items, including label sets (to specify managed servers 130), managed server UIDs, and/or UDG UIDs.

The rule condition portion, which is optional, specifies whether the rule applies to a particular managed server 130 and/or a particular network interface of that managed server. The rule condition portion is a Boolean expression that includes one or more configured characteristics ("CCs"; part of a managed server's description in the administrative domain state 320) and/or network exposure information (e.g., a network interface's BRN identifier; also part of a managed server's description in the administrative domain state 320). A CC portion of the expression specifies whether the rule applies to the particular managed server, while a network exposure information portion of the expression specifies whether the rule applies to a particular network interface of that managed server. If the expression evaluates to "true" for a particular managed server's configured characteristics (specifically, for the values of that managed server's configured characteristics) and a particular network interface's information, then the rule applies to that managed server and that managed server's relevant network interface. If the expression evaluates to "false", then the rule does not apply to that managed server and that managed server's relevant network interface. For example, if a configured characteristic stores an indication of which operating system is running on the managed server, then a rule condition portion that includes that configured characteristic can control whether the rule applies to a particular managed server based on that server's operating system.

Rules within the administrative domain-wide management policy 330 are organized into rule lists. Specifically, the management policy 330 includes one or more rule lists, and a rule list includes one or more rules and (optionally) one or more scopes. A "scope" constrains where (i.e., to which managed servers 130) a rule is applied. A scope includes a provided-by (PB) portion and a used-by (UB) portion that limit the application of the rules in the rule list. The PB portion of the scope limits the PB portion of the rules, and the UB portion of the scope limits the UB portion of the rules. The PB and UB portions of a scope can specify a group of managed servers 130 by using a label set. If the label set does not contain a label for a specific dimension, then there is no scoping of that dimension for the resulting group of managed servers 130. If a rule list does not include any scopes, then its rules are applied globally.

Different scopes can be applied to a single rule list. For example, an end-user can build a set of rules that express how the web service tier consumes services from the database tier, how the load-balancing tier consumes services from the web service tier, and so on. Then, if the end-user wants to apply this rule list to his production environment and to his staging environment, he does not need to copy or duplicate the rule list. Instead, he applies multiple scopes to a single rule list. The scope abstraction makes the rule list scale from both a usability perspective and a computational perspective.

Now that the administrative domain-wide management policy 330 has been described, it is helpful to work through some examples. Consider an administrative domain 150 with a two-tier application where a user device accesses a web server (the first tier), and the web server accesses a database server (the second tier). In the first tier, the user device is the consumer, and the web server is the provider. In the second tier, the web server is the consumer, and the database server is the provider. The administrative domain 150 includes two instances of this application: one in a production environment and one in a staging environment.

The web servers and the database servers are managed servers 130, and their descriptions (e.g., label sets) are present in the administrative domain state 320. For example, their label sets are:
web server in production: <Role, Web> and <Environment, Production>
database server in production: <Role, Database> and <Environment, Production>
web server in staging: <Role, Web> and <Environment, Staging>
database server in staging: <Role, Database> and <Environment, Staging>
(The Application dimension, the Line of Business dimension, and the Location dimension are not relevant to this example, so their labels are omitted.)

Now consider the following administrative domain-wide management policy 330, which is a security policy that specifies access control and secure connectivity:
Rule List #1
  Scopes
    <Environment, Production>
    <Environment, Staging>
  Rules
    #1
      Function: Access Control
      Service: Apache
      PB: <Role, Web>
      UB: Anybody
    #2
      Function: Access Control
      Service: PostgreSQL
      PB: <Role, Database>
      UB: <Role, Web>
Rule List #2
  Scopes: None
  Rules
    #1
      Function: Secure Connectivity
      Service: All
      PB: <Role, Database>
      UB: Any managed server Note that the rules above refer to services simply as "Apache" and "PostgreSQL" for clarity. Remember that a service is a process and is specified by a port/protocol pair and (optionally) additional qualifications, such as process information and/or package information (described above with respect to a description of a managed server 130 within the administrative domain state 320).

Rule List #1/Rule #1 allows any device (e.g., a user device) to connect to a web server and use the Apache service. Specifically, the allowance of a connection is specified by "Access Control" in the Function portion. The "any device" is specified by "Anybody" in the UB portion. The "web server" is specified by "<Role, Web>" (a label set that includes only one label) in the PB portion. The Apache service is specified by "Apache" in the Service portion.

Rule List #1/Rule #2 allows a web server to connect to PostgreSQL on a database server. Specifically, the allowance of a connection is specified by "Access Control" in the Function portion. The "web server" is specified by "<Role, Web>" in the UB portion. The "PostgreSQL" is specified by "PostgreSQL" in the Service portion. The "database server" is specified by "<Role, Database>" (a label set that includes only one label) in the PB portion.

Rule List #1 also prevents inter-environment connections. For example, a web server is allowed to connect to PostgreSQL on a database server if the web server and database server are both in the same environment (e.g., both in the production environment or both in the staging environment). Both servers in the production environment is specified by "<Environment, Production>" (a label set that includes only one label) in the Scope portion, while both servers in the staging environment is specified by "<Environment, Staging>" (a label set that includes only one label) in the Scope portion. As a result, a web server is not allowed to connect to PostgreSQL on a database server if the servers are in different environments (e.g., if the web server is in the staging environment, and the database server is in the production environment).

Rule List #2 states that whenever any managed server connects to a database server, that connection must be performed through an encrypted channel. Specifically, the "database server" is specified by "<Role, Database>" in the PB portion. The "encrypted channel" is specified by "Secure Connectivity" in the Function portion. The "any managed server" is specified by "Any managed server" in the UB portion. The "whenever" is specified by "All" in the Service portion.

Turning aside from the above example, consider the following two managed servers 130: Server 1 is a web server that is part of production, part of app1, and owned by engineering in California. It would be labeled as:
<Role, Web>
<Environment, Production>
<Application, app1>
<LB, Engineering>
<Location, US>
Server 2 is a database server that is part of production, also part of app1, and also owned by engineering but in Germany. It would be labeled as:
<Role, Database Server>
<Environment, Production>
<Application, app1>
<LB, Engineering>
<Location, EU>

Assume that an access control rule allows all access to all managed servers 130 that are part of app1. This rule would allow Server 1 and Server 2 to communicate with each other and would disallow a managed server 130 in Germany that is part of app2 from communicating with Server 1 or Server 2. Now assume that a secure connectivity rule specifies that all network traffic between EU and US must be encrypted. Rule functions are independently applied. In other words, the secure connectivity rule is a separate policy that is applied independent of the access control rule. As a result, the network traffic from Server 1 to Server 2 would be allowed (given the access control rule) and encrypted (given the secure connectivity rule).

Returning to FIG. 3, the processing server 310 generates management instructions for managed servers 130 and sends the generated management instructions to the servers. The processing server 310 also processes local state information received from managed servers 130. The processing server 310 includes various modules such as a policy engine module 340, a relevant rules module 350, a function-level instruction generation module 360, an actor enumeration module 370, a relevant actors module 380, and an administrative domain state update module 385. In one embodiment, the processing server 310 includes a computer (or set of computers) that communicates with the repository 300 and processes data (e.g., by executing the policy engine module 340, the relevant rules module 350, the function-level instruction generation module 360, the actor enumeration module 370, the relevant actors module 380, and the administrative domain state update module 385).

The relevant rules module 350 takes as input the administrative domain-wide management policy 330 and an indication of a particular managed server 130 (e.g., that server's UID) and generates a set of rules that are relevant to that server, and outputs the set of rules. This is a filtering process by which the relevant rules module 350 examines the management policy 330 and extracts only the relevant rules for the given managed server 130. The relevant rules module 350 performs the filtering by iterating through all of the rule lists in the management policy 330, analyzing the scopes of each rule list to determine whether the scopes apply to this managed server 130 and (if the scopes do apply to this managed server 130) analyzing the rules of each rule list to determine whether those rules apply to this managed server 130. A rule applies to a managed server 130 if a) the PB portion of the rule and/or the UB portion of the rule specifies the managed server and b) the condition portion of the rule (if present) evaluates to "true" for that managed server (specifically, for the values of that managed server's configured characteristics and network exposure information). The end result (referred to herein as a "management policy perspective") is a collection of two sets of rules: rules where this managed server 130 provides a service and rules where this managed server 130 consumes a service.

The function-level instruction generation module 360 takes as input a set of rules (e.g., a management policy perspective generated by the relevant rules module 350), generates function-level instructions, and outputs the function-level instructions. The function-level instructions are later sent to a managed server 130 as part of the management instructions. A function-level instruction is similar to a rule in that each one includes a rule function portion, a service portion, a PB portion, and a UB portion. However, whereas a rule can include multiple items within its PB portion and/or UB portion (including label sets, managed server UIDs, and/or UDG UIDs), a function-level instruction includes only one item within its PB portion and only one item within its UB portion. Also, whereas a rule can specify a managed server (including its multiple network interfaces) within its PB portion and/or UB portion, a function-level instruction includes only one network interface within its PB portion and UB portion.

The function-level instruction generation module 360 analyzes a rule and generates one or more function-level instructions based on that rule. If the rule's PB portion includes multiple items, the rule's UB portion incudes multiple items, or a managed server referenced by the rule (in the PB portion or UB portion) has multiple network interfaces, then the function-level instruction generation module 360 generates multiple function-level instructions (e.g., one function-level instruction for each possible combination of a PB item, a UB item, and a particular network interface).

Consider a rule that includes two items in its PB portion (A and B) and two items in its UB portion (C and D). The function-level instruction generation module 360 would generate four function-level instructions with the following PB and UB portions: 1) PB=A, UB=C; 2) PB=A, UB=D; 3) PB=B, UB=C; 4) PB=B, UB=D. Now consider a rule that covers a managed server in its PB portion or UB portion (e.g., by specifying a UID or a label set), and that managed server has multiple network interfaces. The function-level instruction generation module 360 would generate multiple function-level instructions (e.g., one function-level instruction for each network interface of the managed server).

The function-level instruction generation module 360 analyzes the rules, the functions within those rules, and the function profiles referenced by those rules. If a rule list includes multiple scopes, then the function-level instruction generation module 360 applies those scopes multiple times to the rule list iteratively (thereby generating a complete set of function-level instructions for each scope). Recall that a rule function can be associated with multiple function profiles, and a function profile can include a priority. The function-level instruction generation module 360 orders the rules based on the priorities of the various function profiles such that the function profile with the highest priority is used. The function-level instruction generation module 360 translates the ordered rules into function-level instructions for the managed server 130 to execute. Function-level instructions reference the appropriate managed servers 130 and/or unmanaged devices 140 (e.g., the managed servers 130 and/or unmanaged devices 140 that were referenced in the input rules), taking into account the network exposure details of the services associated with the rules.

Note that the function-level instruction generation module 360 can generate a function-level instruction for a particular managed server 130 that turns out to be irrelevant for that server. For example, that managed server is covered by the provided-by (PB) portion of a rule, so the function-level instruction generation module 360 generates a corresponding function-level instruction. However, the rule also includes a portion that specifies the managed server's local state (e.g., a service portion that describes the provided service). Since the global manager 120 does not know the managed server's local state (e.g., whether the managed server is actually providing that service), the generated function-level instruction is sent to the managed server. The managed server checks its local state (e.g., whether it is providing that service) and processes the function-level instruction accordingly, as explained below with reference to the policy compilation module 410.

The actor enumeration module 370 takes as input a collection of descriptions of managed servers 130 and unmanaged device groups (UDGs) (e.g., the state of the administrative domain's computer network infrastructure 320), generates representations of those descriptions of servers and UDGs in an enumerated form (referred to as "actor-sets"), and outputs the actor-sets. For example, the actor enumeration module 370 enumerates the managed servers 130 and the UDGs within the administrative domain state 320 and the possible label sets and assigns each a unique identifier (UID). These actor-sets can then be used in conjunction with UB portions and PB portions of rules and scopes, which specify actors using managed server UIDs, UDG UIDs, and/or label sets.

Consider a logical management model that includes a set of N dimensions $D_i$ (i=1, ..., N), and each dimension $D_i$ includes a set $S_i$ of possible values $V_j$ (j=1, ..., $M_i$) (where the wildcard "*" is one of the possible values). In one embodiment, the actor enumeration module 370 enumerates all label sets that are possible based on the logical management model, which are equal to the Cartesian product given by $S_1 \times S_2 \times \ldots \times S_N$. The size of this set is $M_1 \times M_2 \times \ldots \times M_N$. The enumeration process collapses the multi-dimensional label space of the managed servers 130 into a simple enumerated form.

In another embodiment, the actor enumeration module 370 enumerates only those label sets that are possible based on the administrative domain state 320 (e.g., based on descriptions of managed servers within the administrative domain 150). For example, consider a logical management model that includes 2 dimensions (X and Y), and each dimension includes 3 possible values (A, B, and *). A managed server with the label set "<X=A>,<Y=B>" can be a member of 4 possible label sets: 1) "<X=A>,<Y=B>", 2) "<X=A>,<Y=*>", 3) "<X=*>,<Y=B>", and 4) "<X=*>,<Y=*>". Note that the managed server's label set exists in 2-dimensional space (X and Y), while possible label sets 2, 3, and 4 are projections of the managed server's label set into sub-dimensional spaces (label set 2 is 1-dimensional space (X), label set 3 is 1-dimensional space (Y), and label set 4 is 0-dimensional space). So, the actor enumeration module 370 enumerates those 4 possible label sets. The managed server with the label set "<X=A>,<Y=B>" cannot be a member of the label set "<X=A>,<Y=A>", so the actor enumeration module 370 does not enumerate that label set.

An actor-set includes a UID and zero or more actor-set records. An actor-set record includes a UID (either a managed server UID or an UDG UID), an identifier of the actor's operating system, and the IP address of the actor (managed server 130 or unmanaged device 140) given the specific BRN. For example, an actor-set might include actor-set records whose IP addresses correspond to all of the managed servers 130 covered by the label set of <Role, Database> and <Environment, Production>. As another example, an actor-set might include actor-set records whose IP addresses correspond to all of the unmanaged devices 140 in the Headquarters UDG. A single actor (e.g., managed server 130 or unmanaged device 140) can appear in multiple actor-sets.

Another factor in the actor-set calculation is actors with multiple network interfaces, plus the inclusion of network topology such as network address translation (NAT). So, there could be two actor-sets for the label set of <Role, Database> and <Environment, Production>: one actor-set with the internet-facing IP addresses of those managed servers 130 (i.e., associated with a first BRN), and a different actor-set for those same managed servers with the private network-facing IP addresses of those managed servers (i.e., associated with a second BRN).

In one embodiment, the actor enumeration module 370 can also update actor-sets based on changes to the administrative domain's state 320. For example, the actor enumeration module 370 takes as input actor-sets (previously output by the actor enumeration module) and a change to a managed server's description (within the administrative domain state 320), generates updated actor-sets (which are consistent with the changed server description), and outputs the updated actor-sets. The actor enumeration module 370 generates the updated actor-sets in different ways depending on the type of change to the managed server's description.

Offline/online change—If the description change indicates that the server went from online to offline, then the actor enumeration module 370 generates the updated actor-sets by removing the server's actor-set record from all input actor-sets of which the server was a member. If the description change indicates that the server went from offline to online, then the actor enumeration module 370 generates the updated actor-sets by adding the server's actor-set record to any relevant input actor-sets. (If necessary, the actor enumeration module 370 creates a new actor-set and adds the server's actor-set record to that new actor-set.)

Label set change—If the description change indicates that the server's label set changed, then the actor enumeration module 370 treats this like a first server (with the old label set) going offline and a second server (with the new label set) coming online.

Network exposure information change—If the description change indicates that the server removed a network interface, then the actor enumeration module 370 generates the updated actor-sets by removing the server's actor-set record from all input actor-sets (associated with that network interface's BRN) of which the server was a member. If the description change indicates that the server added a network interface, then the actor enumeration module 370 generates the updated actor-sets by adding the server's actor-set record to any relevant input actor-sets (associated with that network interface's BRN). (If necessary, the actor enumeration module 370 creates a new actor-set (associated with that network interface's BRN) and adds the server's actor-set record to that new actor-set.) If the description change indicates that the server changed a network interface's BRN, then the actor enumeration module 370 treats this like a first network interface (with the old BRN) being removed and a second network interface (with the new BRN) being added. If the description change indicates that the server changed a network interface's IP address (but not the BRN), then the actor enumeration module 370 generates the updated actor-sets by modifying the server's actor-set record in all input actor-sets (associated with that network interface's BRN) of which the server was a member.

The relevant actors module 380 takes as input one or more actor-sets (e.g., the managed servers 130 and the UDGs within the administrative domain state 320 in enumerated form) and a set of rules (e.g., a management policy perspective), determines which actor-sets are relevant to those rules, and outputs only those actor-sets. This is a filtering process by which the relevant actors module 380 examines the actor-sets and extracts only the relevant actor-sets for the given set of rules. The relevant actors module 380 performs the filtering by iterating through all of the input actor-sets, analyzing the PB portions and UB portions of the input rules to determine whether a particular actor-set is referenced by any of the rules' PB portions or UB portions. The end result (referred to herein as an "actor perspective") is a collection of actor-sets. The actor perspective is later sent to a managed server 130 as part of the management instructions.

In one embodiment, the relevant actors module 380 uses the input set of rules to generate an "actor-set filter." The actor-set filter selects, from the input actor-sets, only the actor-sets that are relevant to the input rules. In other words, the relevant actors module 380 uses the actor-set filter to filter the input actor-sets into relevant actor-sets.

The policy engine module 340 generates management instructions for managed servers 130 and sends the generated management instructions to the servers. The policy engine module 340 generates the management instructions (using the relevant rules module 350, the function-level instruction generation module 360, the actor enumeration module 370, and the relevant actors module 380) based on a) the state of the administrative domain's computer network infrastructure 320 and b) the administrative domain-wide management policy 330.

For example, the policy engine module 340 executes the relevant rules module 350, providing as input the administrative domain-wide management policy 330 and the UID of a particular managed server 130. The relevant rules module 350 outputs a set of rules that are relevant to that server (a "management policy perspective"). The policy engine module 340 executes the actor enumeration module 370, providing as input the administrative domain state 320. The actor enumeration module 370 outputs a representation of the descriptions of the managed servers 130 and unmanaged device groups (UDGs) within the administrative domain state 320 in an enumerated form ("actor-sets"). The policy engine module 340 executes the function-level instruction generation module 360, providing as input the management policy perspective (output by the relevant rules module 350). The function-level instruction generation module 360 outputs function-level instructions. The policy engine module 340 executes the relevant actors module 380, providing as input the actor-sets (output by the enumeration module 370) and the management policy perspective (output by the relevant rules module 350). The relevant actors module 380 outputs only those actor-sets that are relevant to those rules ("relevant actor-sets"). The policy engine module 340 sends the function-level instructions (output by the function-level instruction generation module 360) and the relevant actor-sets (output by the relevant actors module 380) to the particular managed server 130.

In one embodiment, the policy engine module 340 caches information that was generated during the above process. For example, the policy engine module 340 caches, in association with the particular managed server 130, the management policy perspective, the function-level instructions, the actor-set filter, and/or the relevant actor-sets. As another example, the policy engine module 340 caches the actor-sets (which are not specific to a particular managed server 130).

Since an administrative domain's actor-sets are based on the administrative domain state 320, a change to the administrative domain state 320 can require a change to the administrative domain's actor-sets. Similarly, since a managed server's management instructions are based on the administrative domain state 320 and the administrative domain-wide management policy 330, a change to the administrative domain state 320 and/or a change to the administrative domain-wide management policy 330 can require a change to the managed server's management instructions. In one embodiment, the policy engine module 340 can update an administrative domain's actor-sets and/or update a managed server's management instructions and then distribute these changes (if necessary) to managed servers 130. The cached information mentioned above helps the policy engine module 340 more efficiently update the administrative domain's actor-sets and/or the managed server's management instructions and distribute the changes.

In one embodiment, the policy engine module 340 updates an administrative domain's actor-sets (based on a change to the administrative domain state 320) and distributes the changes to managed servers 130 as follows: The policy engine module 340 executes the actor enumeration module 370, providing as input the cached actor-sets (previously output by the actor enumeration module) and the changed portion of the administrative domain state 320 (i.e., the changed server description). The actor enumeration module 370 outputs the updated actor-sets. In one embodiment, the policy engine module 340 then sends all of the updated actor-sets to all of the managed servers 130 within the administrative domain 150. However, that embodiment is inefficient, since not all managed servers are affected by changes to all actor-sets.

In another embodiment, only selected actor-sets are sent to selected servers. For example, a particular managed server is sent only those actor-sets that a) were previously sent to that server and b) have changed. The cached relevant actor-sets indicate which actor-sets were previously sent to that server (see (a) above). The policy engine module 340 compares the cached actor-sets to the updated actor-sets to determine which actor-sets have changed (see (b) above). The policy engine module 340 then computes the intersection of (a) and (b). Actor-sets in that intersection are sent to the particular managed server. In one embodiment, for even greater efficiency, actor-sets are sent in "diff" format. For example, the diff format specifies an actor-set identifier, an actor identifier (e.g., a managed server UID or an UDG UID), and an indication of whether that actor should be added, removed, or modified.

In yet another embodiment, two tables are maintained and used to improve efficiency. A first table associates a managed server 130 with actor-sets of which that managed server is a member. A second table associates a managed server 130 with actor-sets that are relevant to that managed server (e.g., as determined by the relevant actors module 380). In these tables, a managed server 130 is represented by, e.g., that managed server's UID, and an actor-set is represented by, e.g., that actor-set's UID. The policy engine module 340 uses the changed portion of the administrative domain state 320 (i.e., the changed server description) to determine which managed server's description changed. The policy engine module 340 uses the first table to determine which actor-sets that managed server was a member of. Those actor-sets might change as a result of the changed server description. So, the policy engine module 340 uses the second table to determine which managed servers those actor-sets are relevant to. The policy engine module 340 performs the intersection computation described above for only those managed servers.

In one embodiment, the policy engine module 340 updates a managed server's management instructions (based on a change to the administrative domain state 320) and sends the updated management instructions to the managed server as follows: The policy engine module 340 executes the relevant rules module 350, providing as input the administrative domain-wide management policy 330 and the UID of the managed server 130. The relevant rules module 350 outputs a set of rules that are relevant to that server (a "management policy perspective"). The policy engine module 340 compares the management policy perspective that was just output to the cached management policy perspective to determine whether they differ. If the just-output management policy perspective and the cached management policy perspective are identical, then the policy engine module 340 takes no further action. In this situation, the previously-generated managed server's management instructions (specifically, the function-level instructions and relevant actor-sets) are consistent with the change to the administrative domain state 320 and do not need to be re-generated and re-sent to the managed server.

If the just-output management policy perspective and the cached management policy perspective differ, then the policy engine module 340 determines which rules should be added to the cached perspective and which rules should be removed from the cached perspective. The policy engine module 340 executes the function-level instruction generation module 360, providing as input the rules to add and the rules to remove. The function-level instruction generation module 360 outputs function-level instructions to add and function-level instructions to remove (relative to the cached function-level instructions, which were previously sent to the managed server). The policy engine module 340 instructs the managed server to add or remove the various function-level instructions, as appropriate. In one embodiment, for greater efficiency, function-level instructions are sent in "diff" format. For example, the diff format specifies a function-level instruction identifier and an indication of whether that function-level instruction should be added to or removed from the previously-sent function-level instructions.

The policy engine module 340 also executes the actor enumeration module 370, providing as input the cached actor-sets and the changed portion of the administrative domain state 320 (i.e., the changed server description). The actor enumeration module 370 outputs the updated actor-sets. The policy engine module 340 executes the relevant actors module 380, providing as input the updated actor-sets and the just-output management policy perspective. The relevant actors module 380 outputs only those updated actor-sets that are relevant to those rules ("updated relevant actor-sets").

The policy engine module 340 compares the updated relevant actor-sets to the cached relevant actor-sets to determine whether they differ. If the updated relevant actor-sets and the cached relevant actor-sets are identical, then the policy engine module 340 sends no actor-sets to the managed server. In this situation, the previously-generated relevant actor-sets are consistent with the change to the administrative domain state 320 and do not need to be re-sent to the managed server. If the updated relevant actor-sets and the cached relevant actor-sets differ, then the policy engine module 340 determines which actor-sets should be added, removed, or modified relative to the cached relevant actor-sets. The policy engine module 340 instructs the managed server to add, remove, or modify the various actor-sets, as appropriate. In one embodiment, for greater efficiency, actor-sets are sent in "diff" format. For example, the diff format specifies an actor-set identifier and an indication of whether that actor-set should be added, removed, or modified relative to the previously-sent actor-sets.

Recall that the policy engine module 340 can update a managed server's management instructions (based on a change to the administrative domain-wide management policy 330) and send the updated management instructions to the managed server. A change to the management policy 330 is, for example, the addition, removal, or modification of a rule or a rule set. In one embodiment, a change to the management policy 330 is generated by interaction with the global manager 120 via a GUI or API. In another embodiment, a change to the management policy 330 is generated by an automated process within the global manager 120 (e.g., in response to a security threat detected by the global manager). The policy engine module 340 updates the managed server's management instructions and sends the updated management instructions to the managed server in a similar way, regardless of whether there was a change to the management policy 330 or a change to the administrative domain state 320. However, there are a few differences.

In the case of a change to the management policy 330, the policy engine module 340 does not necessarily update management instructions for all managed servers 130. Instead, the policy engine module 340 compares the previous management policy 330 to the new management policy 330 to determine which rules should be added, removed, or modified relative to the previous management policy 330. The policy engine module 340 determines which managed servers 130 are affected by the changed rules (e.g., which managed servers are covered by a) the rules' and/or scopes' PB and/or UB portions and b) the rules' conditional portions (if any)). The policy engine module 340 executes the relevant rules module 350, providing as input the changed rules (instead of the entire new management policy 330) and the UID of the managed server 130 (for only those servers that are affected by the changed rules)

The administrative domain state update (ADSU) module 385 receives changes to the administrative domain state 320 and processes those changes. A change to the administrative domain state 320 is, for example, the addition, removal, or modification of a description of a managed server 130 (including the modification of a managed server's label set or configured characteristics) or a description of an unmanaged device or unmanaged device group. In one embodiment, a change to the administrative domain state 320 originates in local state information received from a particular managed server 130. In another embodiment, a change to the administrative domain state 320 is generated by interaction with the global manager 120 via a GUI or API. In yet another embodiment, a change to the administrative domain state 320 is generated by an automated process within the global manager 120 (e.g., in response to a security threat detected by the global manager).

For example, the ADSU module 385 receives a change regarding a particular managed server 130. The ADSU module 385 stores the new information in the administrative domain state 320 as part of the description of that particular managed server 130. The ADSU module 385 then (optionally) analyzes that managed server's description to determine additional information regarding the server and stores that information in the description. The ADSU module 385 then determines whether to update the administrative domain's actor-sets and/or the managed server's management instructions based on a change to the managed server's description. If the ADSU module 385 determines to update the administrative domain's actor-sets, then the ADSU module 385 instructs the policy engine module 340 to update the administrative domain's actor-sets. In one embodiment, the ADSU module 385 waits for an event to occur before instructing the policy engine module 340 to update the administrative domain's actor-sets. If the ADSU module 385 determines to update the managed server's management instructions, then the ADSU module 385 instructs the policy engine module 340 to update the managed server's management instructions. In one embodiment, the ADSU module 385 waits for an event to occur before instructing the policy engine module 340 to update the managed server's management instructions. The aforementioned events can be, for example, receipt of a user command or occurrence of a specified maintenance window.

Whether or not the ADSU module 385 determines to update the administrative domain's actor-sets and/or the managed server's management instructions depends on the type of change to the managed server's description. In one embodiment, the ADSU module 385 makes this determination as shown in Table 2:

TABLE 2

Whether to update administrative domain's actor-sets and/or managed server's management instructions based on type of server description change

| Type of Change | Whether to Update |
| --- | --- |
| Online to offline | Administrative domain's actor-sets: Yes |
| | Managed server's management instructions: No |
| Offline to online | Administrative domain's actor-sets: Yes |
| | Managed server's management instructions: Yes |
| Label set | Administrative domain's actor-sets: Yes |
| | Managed server's management instructions: Yes |
| Configured characteristic | Administrative domain's actor-sets: No |
| | Managed server's management instructions: Yes |
| Network exposure info | Administrative domain's actor-sets: Yes |
| | Managed server's management instructions: Yes (unless IP address is the only change) |
| Service info | Administrative domain's actor-sets: No |
| | Managed server's management instructions: Yes (only in specified situations) |

In one embodiment, the ADSU module 385 determines additional information regarding the server by executing the label/configured characteristic engine and providing the server's description as input. The label/CC engine calculates labels/CC values for the server based on the server's description and label/CC assignment rules.

In another embodiment, the ADSU module 385 determines whether the server is behind a network address translator (NAT) (and, if it is behind a NAT, what type of NAT-1:1 or 1:N). For example, the ADSU module 385 determines whether a NAT exists between the global manager 120 and the managed server 130 by comparing (a) the server's IP address according to the TCP connection between the global manager and the server and (b) the server's IP address according to the local state information received from the server. If (a) and (b) differ, then a NAT exists between the global manager 120 and the managed server 130. If a NAT does exist, then the ADSU module 385 determines the type of NAT (1:1 or 1:N) by performing data center detection. For example, the ADSU module 385 identifies the server's data center by the data center's public IP address. (Alternatively, the managed server performs data center detection by querying information that is external to the server but inside the data center. The server then sends that information to the global manager as part of the local status.) Configuration information indicates which types of NATs are used by which data centers. If no NAT information is associated with a particular data center, then the ADSU module 385 assumes that the NAT type is 1:N.

Figure 4:
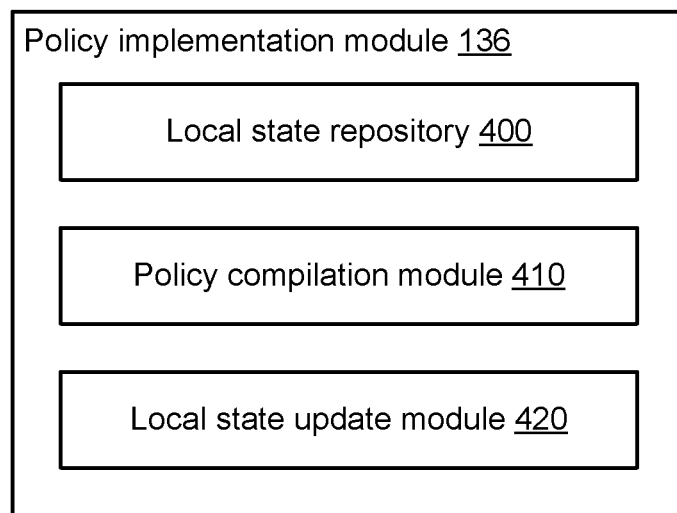
FIG. 4 is a high-level block diagram illustrating a detailed view of a policy implementation module of a managed server, according to one embodiment.

FIG. 4 is a high-level block diagram illustrating a detailed view of a policy implementation module 136 of a managed server 130, according to one embodiment. The policy implementation module 136 includes a local state repository 400, a policy compilation module 410, and a local state update module 420. The local state repository 400 stores information regarding the local state of the managed server 130. In one embodiment, the local state repository 400 stores information regarding the managed server's operating system (OS), network exposure, and services. OS information includes, for example, an indication of which OS is running. Network exposure information and service information were described above with respect to a description of a managed server 130 within the administrative domain state 320.

The policy compilation module 410 takes as input management instructions and state of a managed server 130 and generates a management module configuration 134. For example, the management instructions are received from the global manager 120 and include function-level instructions (generated by the function-level instruction generation module 360) and relevant actor-sets (output by the relevant actors module 380). The state of the managed server 130 is retrieved from the local state repository 400. In one embodiment, execution of the policy compilation module 410 is triggered by a) the managed server powering up or coming online, b) the managed server receiving function-level instructions, and/or c) the contents of the local state repository 400 changing.

The policy compilation module 410 maps the function-level instructions and relevant actor-sets into a management module configuration 134. For example, the policy compilation module 410 maps an access control function-level instruction (which contains a port and an actor-set reference) into an iptables entry and an ipset entry in the Linux operating system or a Windows Filtering Platform (WFP) rule in the Windows operating system.

The application of management policy at a managed server 130 can be affected by the local state of that server. In one embodiment, the policy compilation module 410 evaluates a condition associated with a received function-level instruction and generates the management module configuration 134 based on the result of that evaluation. For example, the policy compilation module 410 evaluates a condition that references the operating system of the managed server's peer (i.e., the other actor in the relationship) and selects function profile attributes based on the result of that evaluation, where the selected function profile attributes are expressed in the management module configuration 134.

As another example, recall that a managed server 130 can receive a function-level instruction that turns out to be irrelevant for that server. For example, the rule includes a portion that specifies the managed server's local state (e.g., a service portion that describes the provided service). Since the global manager 120 does not know the managed server's local state (e.g., whether the managed server is actually providing that service), the generated function-level instruction is sent to the managed server. The policy compilation module 410 checks the managed server's local state (e.g., determines whether the managed server is providing that service). This determination amounts to evaluating a condition that references the managed server's local state. The policy compilation module 410 processes the function-level instruction accordingly. If the policy compilation module 410 determines that the condition evaluates to "true" (e.g., the managed server is providing that service), then the policy compilation module 410 incorporates that function-level instruction into the management module configuration 134. Specifically, the policy compilation module 410 incorporates function-level instructions into the management module configuration 134 only after evaluating the associated condition (which concerns the local state of that server). If the evaluation of the condition is false, then the policy compilation module 410 does not express the function-level instructions in the management module configuration 134. The specific conditions (e.g., their nature and particular values) are extensible. In one embodiment, the conditions are related to the definition of a "service" and include process information and/or package information (described above with respect to a description of a managed server 130 within the administrative domain state 320).

For example, consider a function-level instruction that allows access to only the Apache service inbound on port 80 (i.e., where the managed server 130 is the "provider" or endpoint). The managed server 130 expresses this function-level instruction in the management module configuration 134 to allow access on port 80 only after evaluating the associated condition, which concerns whether the application (executing on that server) that is listening on port 80 is actually Apache and not some other application (rogue or otherwise). The managed server 130 expresses this function-level instruction in the management module configuration 134 only after determining that the associated condition evaluates to "true." If the associated condition evaluates to "false," then the managed server 130 does not express this function-level instruction in the management module configuration 134. As a result, the network traffic is blocked.

In one embodiment, a managed server 130 monitors its outbound connections. The managed server 130 compares outbound network traffic to its internal process table to determine which processes in that table are establishing those outbound connections. The managed server 130 can enforce a rule that allows only certain processes (given a set of requirements, mentioned above) to establish an outbound connection.

In one embodiment (not shown), the policy compilation module 410 is located at the global manager 120 instead of at the managed server 130. In that embodiment, the global manager 120 does not send management instructions to the managed server 130. Instead, the managed server 130 sends its local state to the global manager 120. After the policy compilation module 410 generates the management module configuration 134 (at the global manager 120), the management module configuration 134 is sent from the global manager 120 to the managed server 130.

The local state update (LSU) module 420 monitors the local state of the managed server 130 and sends local state information to the global manager 120. In one embodiment, the LSU module 420 determines an initial local state of the managed server 130, stores appropriate local state information in the local state repository 400, and sends that local state information to the global manager 120. The LSU module 420 determines the local state of the managed server 130 by inspecting various parts of the server's operating system (OS) and/or file system. For example, the LSU module 420 obtains service information from the OS' kernel tables (networking information), the OS' system tables (package information), and the file system (files and hash values). The LSU module 420 obtains network exposure information from the OS' kernel and and/or OS-level data structures.

After the LSU module 420 sends the initial local state information to the global manager 120, the LSU module monitors changes to the local state. The LSU module monitors changes by, for example, polling (e.g., performing inspections periodically) or listening (e.g., subscribing to an event stream). The LSU module 420 compares recently-obtained local state information to information already stored in the local state repository 400. If the information matches, then the LSU module 420 takes no further action (until local state information is obtained again). If they differ, then the LSU module 420 stores the recently-obtained information in the local state repository 400, executes the policy compilation module 410 to re-generate the management module configuration 134 (and re-configures the management module 132 accordingly), and notifies the global manager 120 of the change. In one embodiment, the LSU module 420 sends changes to local state information to the global manager 120 in "diff" format. For example, the diff format specifies a type of local state information (e.g., operating system) and a new value for that information type.

In another embodiment, the LSU module 420 sends the entire contents of the local state repository 400 to the global manager 120.

Figure 5:
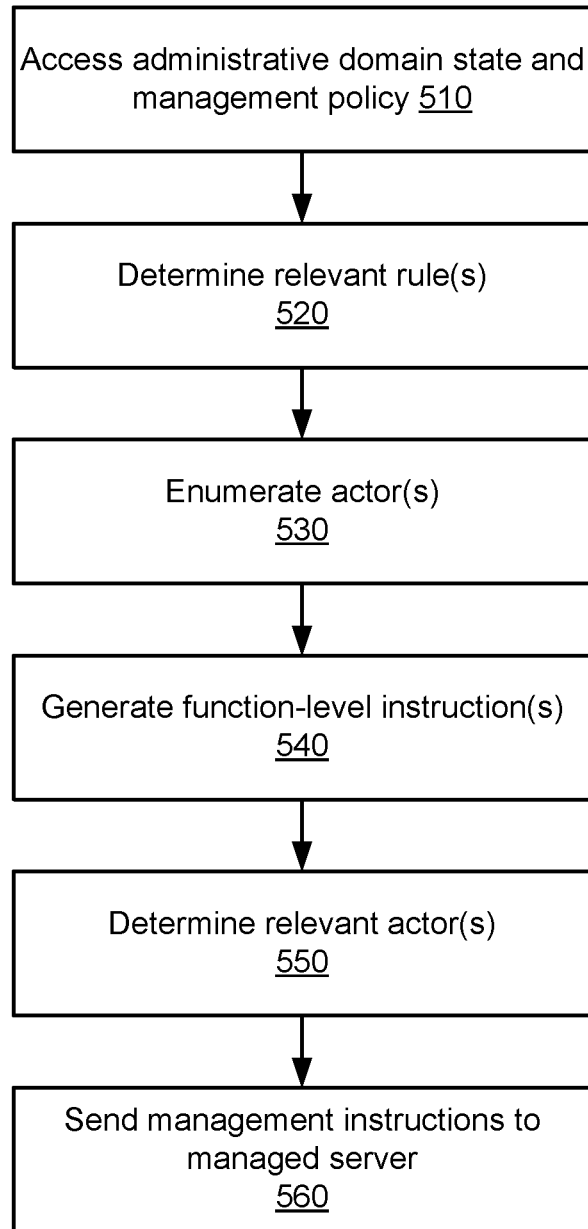
FIG. 5 is a flowchart illustrating a method of generating management instructions for a particular managed server, according to one embodiment.

FIG. 5 is a flowchart illustrating a method 500 of generating management instructions for a particular managed server 130, according to one embodiment. Other embodiments can perform the steps in different orders and can include different and/or additional steps. In addition, some or all of the steps can be performed by entities other than those shown in FIG. 1. In one embodiment, the method 500 is executed multiple times (e.g., once for each managed server 130 in an administrative domain 150).

When the method 500 starts, the state of the administrative domain's computer network infrastructure 320 and an administrative domain-wide management policy 330 have already been stored in the repository 300 of the global manager 120. At this point, the method 500 begins.

In step 510, the administrative domain state 320 and the administrative domain-wide management policy 330 are accessed. For example, the policy engine module 340 sends a request to the repository 300 and receives the administrative domain state 320 and the administrative domain-wide management policy 330 in response.

In step 520, one or more relevant rules are determined. For example, the policy engine module 340 executes the relevant rules module 350, providing as input the administrative domain-wide management policy 330 and the UID of the particular managed server 130. The relevant rules module 350 outputs a set of rules that are relevant to that server (management policy perspective).

In step 530, actors are enumerated. For example, the policy engine module 340 executes the actor enumeration module 370, providing as input the administrative domain state 320. The actor enumeration module 370 generates a representation of the managed servers 130 and unmanaged device groups (UDGs) within the administrative domain state 320 in an enumerated form (actor-sets).

In step 540, one or more function-level instructions are generated. For example, the policy engine module 340 executes the function-level instruction generation module 360, providing as input the management policy perspective (generated in step 520). The function-level instruction generation module 360 generates function-level instructions.

In step 550, one or more relevant actors is determined. For example, the policy engine module 340 executes the relevant actors module 380, providing as input the actor-sets (generated in step 530) and the management policy perspective (generated in step 520). The relevant actors module 380 outputs only those actor-sets that are relevant to those rules (relevant actor-sets).

In step 560, management instructions are sent to the particular managed server 130. For example, the policy engine module 340 sends the function-level instructions (generated in step 540) and the relevant actor-sets (generated in step 550) to the particular managed server 130.

Note that steps 520 and 540 concern generating the management policy perspective (and resulting function-level instructions) for a particular managed server 130, while steps 530 and 550 concern generating the actor perspective for that managed server. The generation of the management policy perspective and the generation of the actor perspective are minimally dependent on each other, since step 520 generates a set of rules that is used by step 550. Even so, keeping the management policy calculations (i.e., steps 520 and 540) and the actor-set calculations (i.e., steps 530 and 550) separate enhances the scalability of the policy engine module 340. Since the management policy calculations and the actor-set calculations are kept mostly separate, they can be performed in parallel (e.g., even for the same managed server 130). In addition, perspective calculations for different managed servers 130 can also be performed in parallel. Also, if an actor changes, then only the actor-sets need to be recalculated. (The function-level instructions do not need to be recalculated.) If a rule changes, then only the function-level instructions and the relevant actor-sets need to be recalculated. (The actors do not need to be re-enumerated.)

Figure 6:
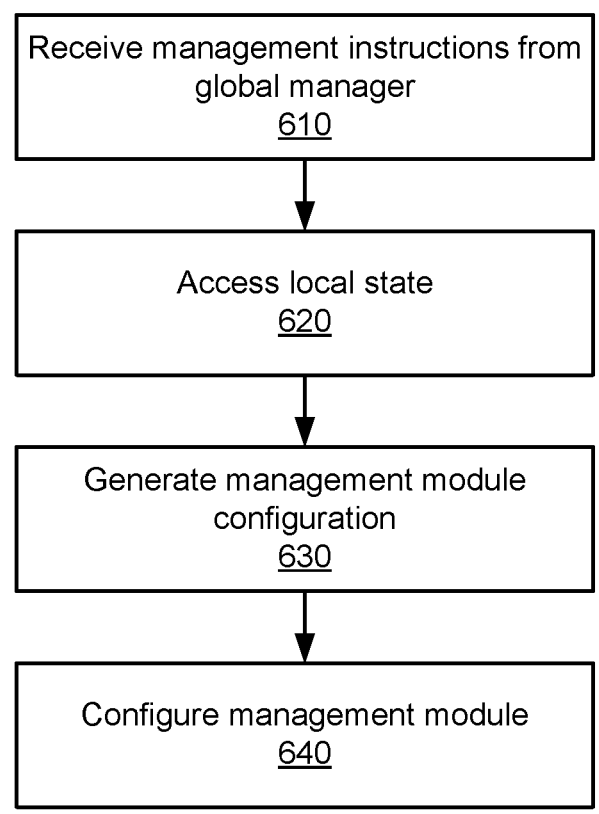
FIG. 6 is a flowchart illustrating a method of generating a configuration for a management module of a managed server, according to one embodiment.

FIG. 6 is a flowchart illustrating a method 600 of generating a configuration 134 for a management module 132 of a managed server 130, according to one embodiment. Other embodiments can perform the steps in different orders and can include different and/or additional steps. In addition, some or all of the steps can be performed by entities other than those shown in FIG. 1.

When the method 600 starts, information regarding the local state of the managed server 130 has already been stored in the local state repository 400 of the policy implementation module 136 in the managed server 130. At this point, the method 600 begins.

In step 610, management instructions are received from the global manager 120. For example, the policy compilation module 410 receives function-level instructions and relevant actor-sets from the global manager 120.

In step 620, the local state is accessed. For example, the policy compilation module 410 accesses information regarding the local state of the managed server 130 that is stored in the local state repository 400.

In step 630, a management module configuration 134 is generated. For example, the policy compilation module 410 takes as input the management instructions (received in step 610) and the local state (accessed in step 620) and generates a management module configuration 134.

In step 640, a management module 132 is configured. For example, the policy compilation module 410 configures the management module 132 to operate in accordance with the management module configuration 134 (generated in step 630).

Figure 7:
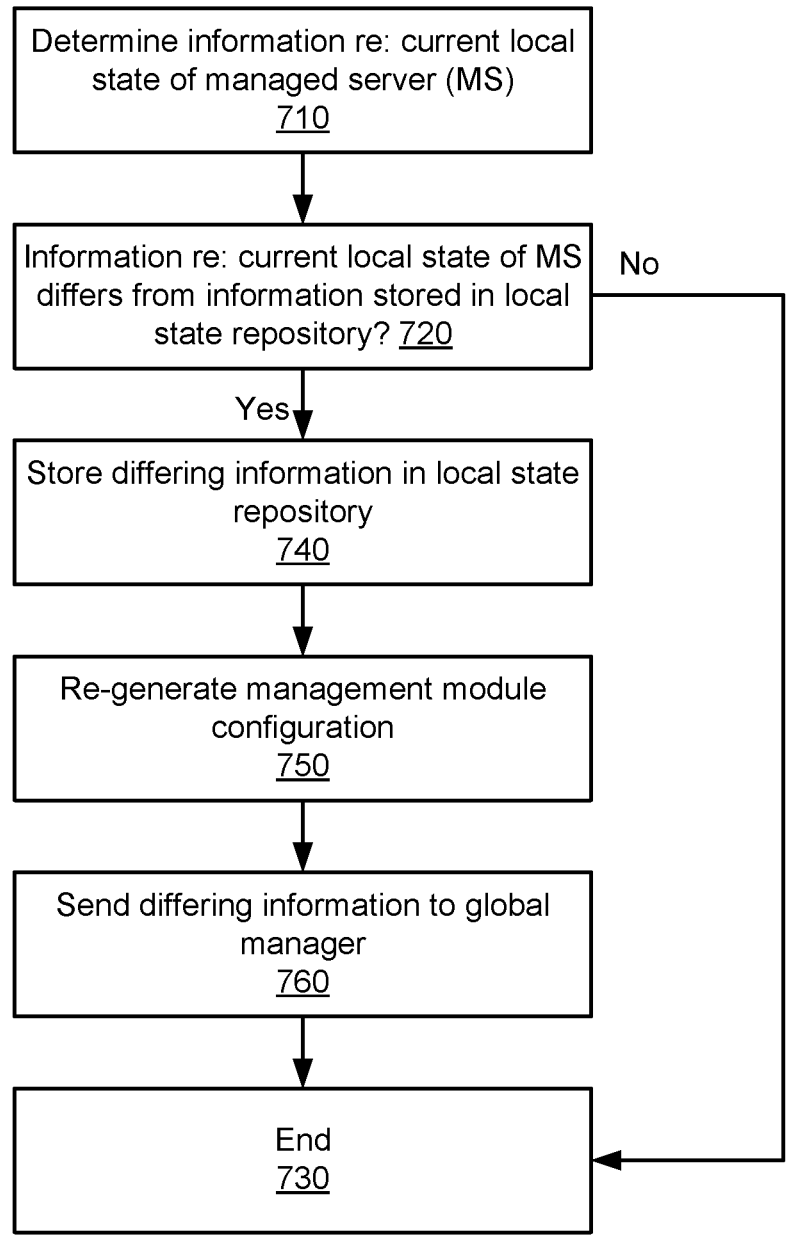
FIG. 7 is a flowchart illustrating a method of monitoring local state of a managed server and sending local state information to a global manager, according to one embodiment.

FIG. 7 is a flowchart illustrating a method 700 of monitoring local state of a managed server 130 and sending local state information to a global manager 120, according to one embodiment. Other embodiments can perform the steps in different orders and can include different and/or additional steps. In addition, some or all of the steps can be performed by entities other than those shown in FIG. 1.

When the method 700 starts, information regarding local state of the managed server 130 has already been stored in the local state repository 400 of the managed server 130. At this point, the method 700 begins.

In step 710, information regarding the current local state of the managed server 130 is determined. For example, the LSU module 420 determines the local state of the managed server 130 by inspecting various parts of the server's operating system (OS) and/or file system.

In step 720, a determination is performed regarding whether information regarding the current local state differs from information stored in the local state repository 400. For example, the LSU module 420 performs this determination. If the information does not differ, then the method proceeds to step 730 and ends. If the information does differ, then the method proceeds to step 740.

In step 740, the differing information is stored in the local state repository 400. For example, the LSU module 420 performs this step.

In step 750, the management module configuration 134 is re-generated (because the contents of the local state repository 400 have changed) and the management module 132 is re-configured accordingly. For example, the LSU module 420 executes the policy compilation module 410, which re-generates the management module configuration 134.

In step 760, the differing information is sent to the global manager 120. For example, the LSU module 420 performs this step.

Figure 8:
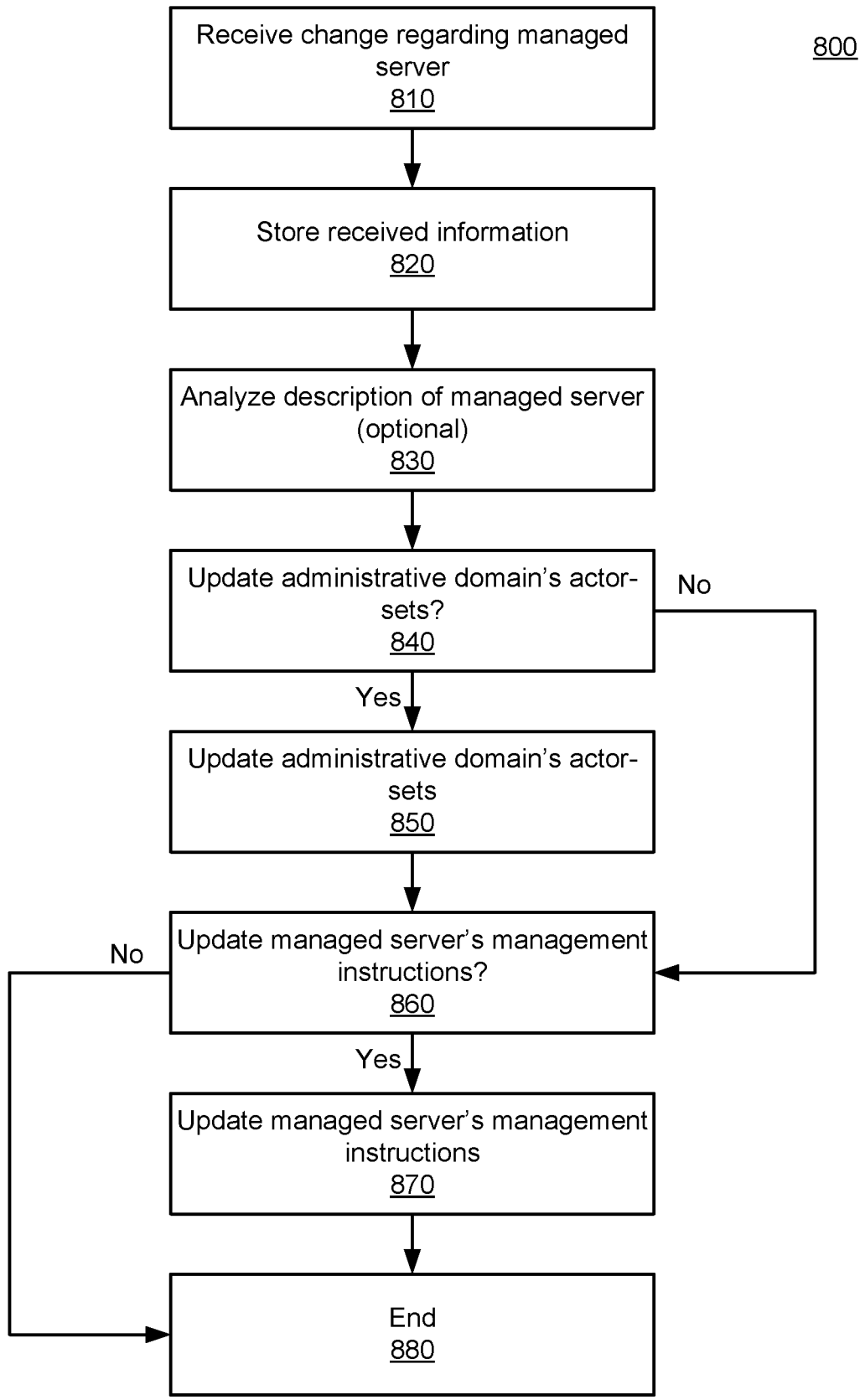
FIG. 8 is a flowchart illustrating a method of processing a change to the state of an administrative domain's computer network infrastructure, according to one embodiment.

FIG. 8 is a flowchart illustrating a method 800 of processing a change to the state of an administrative domain's computer network infrastructure 320, according to one embodiment. Other embodiments can perform the steps in different orders and can include different and/or additional steps. In addition, some or all of the steps can be performed by entities other than those shown in FIG. 1.

In step 810, a change regarding a particular managed server 130 is received. For example, the administrative domain state update (ADSU) module 385 receives an online/offline indicator, an operating system indicator, network exposure information, and/or service information from the managed server 130 as part of local state information.

In step 820, the received information is stored. For example, the ADSU module 385 stores the received online/offline indicator, network exposure information, and/or service information in the administrative domain state 320 (specifically, in the description of the managed server 130 to which the information pertains).

In step 830, the server description is analyzed to determine additional information regarding the server. For example, the ADSU module 385 uses a label/configured characteristic engine to calculate labels/CC values for the server and/or determines whether the server is behind a network address translator (NAT) (and, if it is behind a NAT, what type of NAT-1:1 or 1:N) and stores that information in the server description. Step 830 is optional.

In step 840, a determination is made regarding whether to update the administrative domain's actor-sets. For example, the ADSU module 385 determines whether to update the administrative domain's actor-sets based on a change to the managed server's description. If a determination is made to update the administrative domain's actor-sets, then the method proceeds to step 850. If a determination is made not to update the administrative domain's actor-sets, then the method proceeds to step 860.

In step 850, the administrative domain's actor-sets are updated. For example, the ADSU module 385 instructs the policy engine module 340 to update the administrative domain's actor-sets. In one embodiment (not shown), the ADSU module 385 waits for an event to occur before instructing the policy engine module 340 to update the administrative domain's actor-sets.

In step 860, a determination is made regarding whether to update the managed server's management instructions. For example, the ADSU module 385 determines whether to update the managed server's management instructions based on a change to the managed server's description. If a determination is made to update the managed server's management instructions, then the method proceeds to step 870. If a determination is made not to update the administrative domain's actor-sets, then the method proceeds to step 880.

In step 870, the managed server's management instructions are updated. For example, the ADSU module 385 instructs the policy engine module 340 to update the managed server's management instructions. In one embodiment (not shown), the ADSU module 385 waits for an event to occur before instructing the policy engine module 340 to update the managed server's management instructions.

In step 880, the method ends.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for enforcing a management policy on a managed server, the method comprising:
   receiving, by the managed server, function-level instructions each specifying a service, a label set for a provided-by portion, and a label set for a used-by portion, wherein the label set for the provided-by portion is associated with devices permitted to provide the service to devices associated with the label set for the used-by portion;
   receiving, by the managed server, actor-sets each associated with a corresponding label set, each actor-set including actor-set records identifying devices having the corresponding label set;
   generating, based on the function-level instructions and the actor-sets, a management module configuration for controlling communications to and from the managed server;
   configuring a management module of the managed server according to the management module configuration; and
   operating the management module to permit communications permitted by the function-level instructions and block communications not permitted by the function-level instructions.

2. The method of claim 1, further comprising:
   storing, in a local state repository, a local state of the managed server;
   determining, based on the state information, whether the managed server is providing a service specified in a given function-level instruction; and
   responsive to determining that the managed server provides the service, incorporating the given function-level instruction into the management module configuration.

3. The method of claim 1, further comprising:
   storing, in a local state repository, a local state of the managed server;
   determining, based on the state information, whether the managed server is providing a service specified in a given function-level instruction; and
   responsive to determining that the managed server is not providing service, omitting the given function-level instruction from the management module configuration.

4. The method of claim 1, wherein generating the management module configuration is further based on a local state of the managed server, the method further comprising:
   detecting, by a local state update module, an initial local state of the managed server;
   storing the initial local state to a local state repository;
   monitoring the managed server for a change in the initial local state stored in the local state repository to an updated local state;
   responsive to detecting the change, storing the updated local state to the local state repository and re-generating the management configuration based on the change.

5. The method of claim 1, further comprising:
   detecting, by a local state update module, an initial local state of the managed server;
   storing the initial local state to a local state repository;
   sending the initial local state of the managed server to a global manager;
   monitoring the managed server for a change in the initial local state stored in the local state repository to an updated local state;
   responsive to detecting the change, storing the updated local state to the local state repository, sending a notification of the change to the global manager.

6. The method of claim 1, wherein the service comprises a process associated with a particular network port and network protocol.

7. The method of claim 1, wherein configuring the management module comprises programming a table of IP addresses to cause a firewall of the managed server to permit communications permitted by the function-level instructions and to block communications not permitted by the function-level instructions.

8. A non-transitory computer-readable storage medium storing instructions executed by a processor for enforcing a management policy on a managed server, the instructions when executed causing the processor to perform steps including:
   receiving, by the managed server, function-level instructions each specifying a service, a label set for a provided-by portion, and a label set for a used-by portion, wherein the label set for the provided-by portion is associated with devices permitted to provide the service to devices associated with the label set for the used-by portion;
   receiving, by the managed server, actor-sets each associated with a corresponding label set, each actor-set including actor-set records identifying devices having the corresponding label set;
   generating, based on the function-level instructions and the actor-sets, a management module configuration for controlling communications to and from the managed server;
   configuring a management module of the managed server according to the management module configuration; and
   operating the management module to permit communications permitted by the function-level instructions and block communications not permitted by the function-level instructions.

9. The non-transitory computer-readable storage medium of claim 8, wherein the instructions when executed further cause the processor to perform steps including:
   storing, in a local state repository, a local state of the managed server;
   determining, based on the state information, whether the managed server is providing a service specified in a given function-level instruction; and
   responsive to determining that the managed server provides the service, incorporating the given function-level instruction into the management module configuration.

10. The non-transitory computer-readable storage medium of claim 8, wherein the instructions when executed further cause the processor to perform steps including:
    storing, in a local state repository, a local state of the managed server;

determining, based on the state information, whether the managed server is providing a service specified in a given function-level instruction; and responsive to determining that the managed server is not providing service, omitting the given function-level instruction from the management module configuration.

11. The non-transitory computer-readable storage medium of claim 8, wherein generating the management module configuration is further based on a local state of the managed server, the instructions when executed further causing the processor to perform steps including:

detecting, by a local state update module, an initial local state of the managed server;

storing the initial local state to a local state repository;

monitoring the managed server for a change in the initial local state stored in the local state repository to an updated local state;

responsive to detecting the change, storing the updated local state to the local state repository and re-generating the management configuration based on the change.

12. The non-transitory computer-readable storage medium of claim 8, wherein the instructions when executed further cause the processor to perform steps including:

detecting, by a local state update module, an initial local state of the managed server;

storing the initial local state to a local state repository;

sending the initial local state of the managed server to a global manager;

monitoring the managed server for a change in the initial local state stored in the local state repository to an updated local state;

responsive to detecting the change, storing the updated local state to the local state repository, sending a notification of the change to the global manager.

13. The non-transitory computer-readable storage medium of claim 8, wherein the service comprises a process associated with a particular network port and network protocol.

14. The non-transitory computer-readable storage medium of claim 8, wherein configuring the management module comprises programming a table of IP addresses to cause a firewall of the managed server to permit communications permitted by the function-level instructions.

15. A managed server for enforcing a management policy, the managed server comprising:

a processor; and a non-transitory computer-readable storage medium storing instructions executed by a processor for enforcing a management policy on the managed server, the instructions when executed causing the processor to perform steps including:

receiving, by the managed server, function-level instructions each specifying a service, a label set for a provided-by portion, and a label set for a used-by portion, wherein the label set for the provided-by portion is associated with devices permitted to provide the service to devices associated with the label set for the used-by portion;

receiving, by the managed server, actor-sets each associated with a corresponding label set, each actor-set including actor-set records identifying devices having the corresponding label set;

generating, based on the function-level instructions and the actor-sets, a management module configuration for controlling communications to and from the managed server;

configuring a management module of the managed server according to the management module configuration; and operating the management module to permit communications permitted by the function-level instructions and block communications not permitted by the function-level instructions.

16. The managed server of claim 15, wherein the instructions when executed further cause the processor to perform steps including:

storing, in a local state repository, a local state of the managed server;

determining, based on the state information, whether the managed server is providing a service specified in a given function-level instruction; and responsive to determining that the managed server provides the service, incorporating the given function-level instruction into the management module configuration.

17. The managed server of claim 15, wherein the instructions when executed further cause the processor to perform steps including:

storing, in a local state repository, a local state of the managed server;

determining, based on the state information, whether the managed server is providing a service specified in a given function-level instruction; and responsive to determining that the managed server is not providing service, omitting the given function-level instruction from the management module configuration.

18. The managed server of claim 15, wherein generating the management module configuration is further based on a local state of the managed server, the instructions when executed further causing the processor to perform steps including:

detecting, by a local state update module, an initial local state of the managed server;

storing the initial local state to a local state repository;

monitoring the managed server for a change in the initial local state stored in the local state repository to an updated local state;

responsive to detecting the change, storing the updated local state to the local state repository and re-generating the management configuration based on the change.

19. The managed server of claim 15, wherein the instructions when executed further cause the processor to perform steps including:

detecting, by a local state update module, an initial local state of the managed server;

storing the initial local state to a local state repository;

sending the initial local state of the managed server to a global manager;

monitoring the managed server for a change in the initial local state stored in the local state repository to an updated local state;

responsive to detecting the change, storing the updated local state to the local state repository, sending a notification of the change to the global manager.

20. The managed server of claim 15, wherein configuring the management module comprises programming a table of IP addresses to cause a firewall of the managed server to permit communications permitted by the function-level instructions.

* * * * *